(12) United States Patent
Hari

(10) Patent No.: US 12,534,493 B2
(45) Date of Patent: Jan. 27, 2026

(54) BRIDGED NUCLEOSIDE AND NUCLEOTIDE

(71) Applicant: Liid Pharmaceuticals, Inc., Osaka (JP)

(72) Inventor: Yoshiyuki Hari, Tokushima (JP)

(73) Assignee: Liid Pharmaceuticals, Inc., Osaka (JP)

( * ) Notice: Subject to any disclaimer, the term of this patent is extended or adjusted under 35 U.S.C. 154(b) by 532 days.

(21) Appl. No.: 18/010,146

(22) PCT Filed: Jun. 4, 2021

(86) PCT No.: PCT/JP2021/021324
§ 371 (c)(1),
(2) Date: Dec. 16, 2022

(87) PCT Pub. No.: WO2021/256297
PCT Pub. Date: Dec. 23, 2021

(65) Prior Publication Data
US 2023/0322840 A1    Oct. 12, 2023

(30) Foreign Application Priority Data

Jun. 15, 2020 (JP) ................................ 2020-103409
Jan. 22, 2021 (JP) ................................ 2021-008778

(51) Int. Cl.
*C07H 19/067* (2006.01)
*C07H 19/167* (2006.01)

(52) U.S. Cl.
CPC ......... *C07H 19/067* (2013.01); *C07H 19/167* (2013.01); *C12N 2310/3231* (2013.01)

(58) Field of Classification Search
None
See application file for complete search history.

(56) References Cited

FOREIGN PATENT DOCUMENTS

| WO | WO-2016/017422 A1 | 2/2016 | |
|---|---|---|---|
| WO | WO-2018/203574 A1 | 11/2018 | |
| WO | WO-2019/002237 A1 | 1/2019 | |
| WO | WO-2019122277 A1 * | 6/2019 | ............. C07H 21/04 |

OTHER PUBLICATIONS

Yoshiyuki et al., American Chemical Society, 15(14), pp. 3702-3705, Jun. 4, 2013 (Year: 2013).*
International Search Report in PCT/JP2021/021324 dated Jul. 27, 2021 (English translation).
Yoshiyuki et al., Synthesis and Properties of 2'-O,4'-C-Ethyleneoxy Bridged 5-Methyluridine, American Chemical Society, 15(14):3702-3705 (Jun. 4, 2013).

* cited by examiner

*Primary Examiner* — Traviss C Mcintosh, III
(74) *Attorney, Agent, or Firm* — MARSHALL, GERSTEIN & BORUN LLP

(57) ABSTRACT

[Problem]
Provision of bridged nucleosides and nucleotides that are less susceptible to decomposition by nuclease in vivo, have high binding affinity and specificity for the target mRNA, and can efficiently regulate the expression of specific genes.
[Solving Means]
A compound represented by the following formula (I), a pharmaceutically acceptable salt thereof, or a pharmaceutically acceptable solvate thereof:

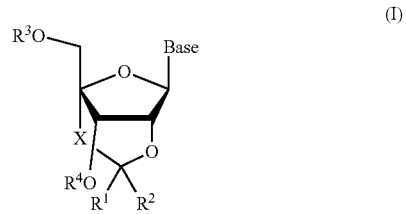

(I)

in the formula (I), Base shows a purin-9-yl group or a 2-oxo-1,2-dihydropyrimidin-1-yl group optionally having one or more substituents, $R^1$ and $R^2$ are each independently a hydrogen atom or the like, and $R^3$ and $R^4$ are each independently a hydrogen atom or the like.

9 Claims, 1 Drawing Sheet
Specification includes a Sequence Listing.

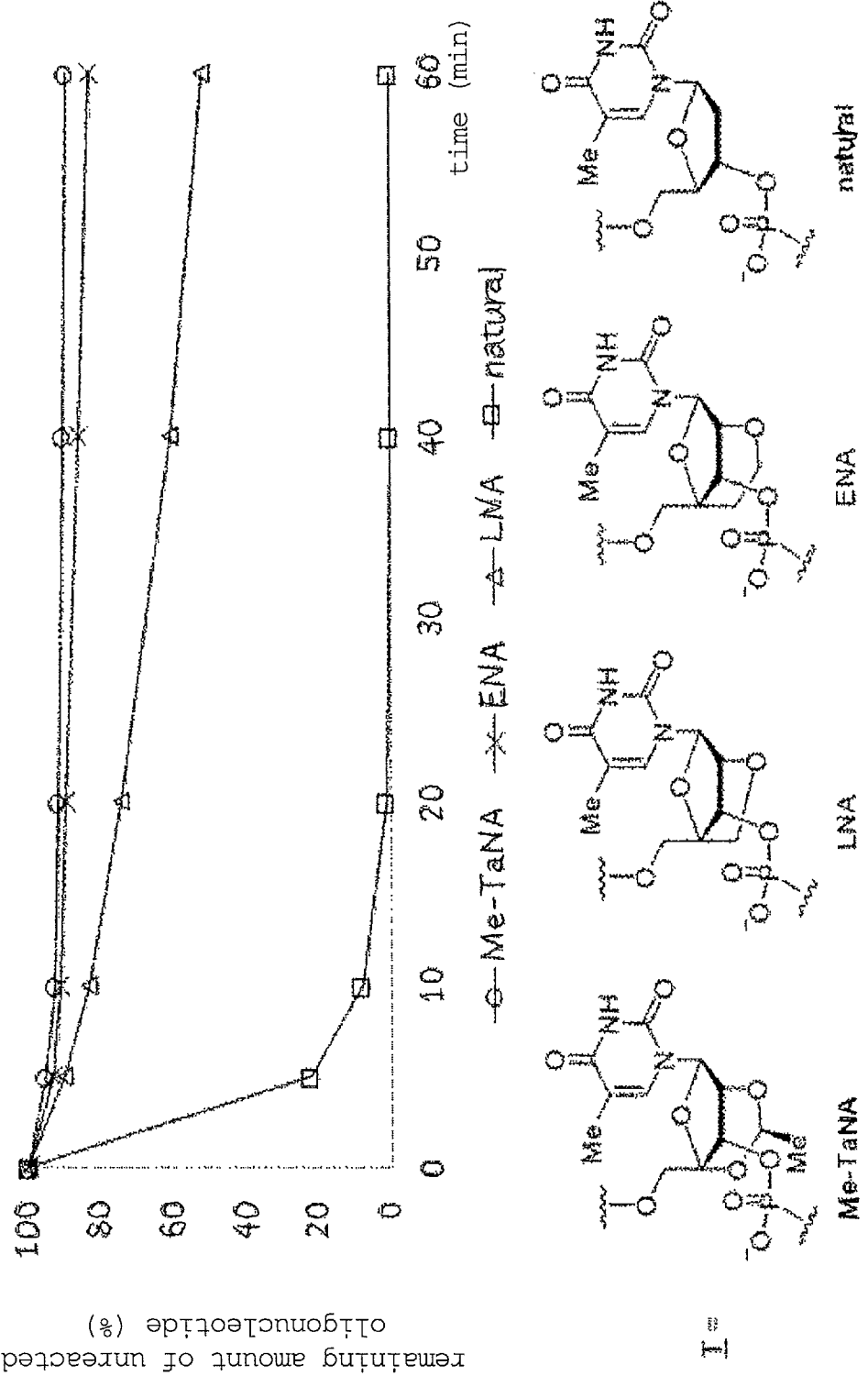

BRIDGED NUCLEOSIDE AND NUCLEOTIDE

CROSS REFERENCE TO RELATED APPLICATIONS

This application is a U.S. national stage of International Application No. PCT/JP2021/021324, filed Jun. 4, 2021, which claims the benefit of Japanese Patent Application No. 2021-008778, filed Jan. 22, 2021, and Japanese Patent Application No. 2020-103409, filed Jun. 15, 2020, the entire contents of each of which are fully incorporated herein by reference.

INCORPORATION BY REFERENCE OF MATERIAL SUBMITTED ELECTRONICALLY

A Sequence Listing, which is a part of the present disclosure, is submitted concurrently with the specification as a text file. The name of the text file containing the Sequence Listing is "58644_Seqlisting.txt." The Sequence Listing was created on Dec. 12, 2022, and is 10,925 bytes in size. The subject matter of the Sequence Listing is incorporated by reference herein in its entirety.

TECHNICAL FIELD

The present invention relates to bridged nucleosides and nucleotides. More particularly, it relates to bridged nucleosides and nucleotides having high binding affinity for single stranded RNA and double-stranded DNA, and high resistance to nuclease.

BACKGROUND ART

As therapeutic methods for diseases by nucleic acid medicine, antisense method, antigene method, aptamer, siRNA, and the like can be mentioned. Among these, the antisense method is a method for treating and preventing diseases, based on the inhibition of the translation process of pathogenic RNA by introducing an oligonucleotide (antisense strand) complementary to the mRNA involved in the disease from the outside to form a double strand. siRNA is similar to this, and inhibits translation from mRNA to protein with double-stranded RNA administered to the living body. On the other hand, the antigene method suppresses transcription from DNA to RNA by introducing, from the outside, triplex strand-forming oligonucleotide corresponding to the DNA site that transcribes the pathogenic RNA. In addition, since aptamers are short nucleic acid molecules (oligonucleotides), they exert their functions by binding to biological components such as proteins that cause diseases.

WO2016/017422 describes bridged nucleosides and nucleotides. Bridged nucleosides and nucleotides have superior functions; however, the development of still more superior nucleosides and nucleotides is desired.

CITATION LIST

Patent Literature

[PTL 1]
WO 2016/017422

SUMMARY OF INVENTION

Technical Problem

A certain invention described in the present specification aims to provide bridged nucleosides and nucleotides that are less susceptible to decomposition by nuclease in vivo, have high binding affinity and specificity for the target mRNA, and can efficiently regulate the expression of specific genes.

Solution to Problem

A certain invention described in the present specification relates to a compound represented by the following formula (I), a pharmaceutically acceptable salt thereof, or a pharmaceutically acceptable solvate thereof.

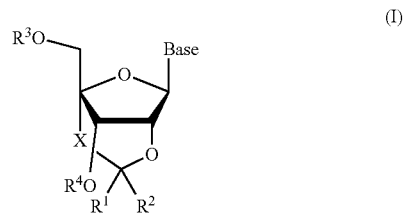

(I)

In the formula (I),

Base shows a purin-9-yl group or a 2-oxo-1,2-dihydropyrimidin-1-yl group optionally having any one or more substituents selected from an α Group, wherein the α Group is composed of a hydroxy group, a hydroxy group protected by a protecting group in nucleic acid synthesis, a straight chain alkyl group having 1 to 6 carbon atoms, a straight chain alkoxy group having 1 to 6 carbon atoms, a mercapto group, a mercapto group protected by a protecting group in nucleic acid synthesis, a straight chain alkylthio group having 1 to 6 carbon atoms, an amino group, a straight chain alkylamino group having 1 to 6 carbon atoms, an amino group protected by a protecting group in nucleic acid synthesis, and a halogen atom.

$R^1$ and $R^2$ are each independently
a hydrogen atom or
an alkyl group having 1 to 7 carbon atoms, which is optionally branched or forming a ring, and unsubstituted or substituted by a hydroxy group, a mercapto group, an alkoxy group having 1 to 6 carbon atoms, or an alkylthio group having 1 to 6 carbon atoms.

$R^3$ and $R^4$ are each independently
a hydrogen atom,
a hydroxy-protecting group in nucleic acid synthesis,
an alkyl group having 1 to 7 carbon atoms and optionally branched or forming a ring,
an alkenyl group having 2 to 7 carbon atoms and optionally branched or forming a ring,
an aryl group having 3 to 12 carbon atoms, which optionally has any one or more substituents selected from the aforementioned a Group and which optionally contains a hetero atom,
an aralkyl group having an aryl moiety having 3 to 12 carbon atoms which moiety optionally having any one or more substituents selected from the aforementioned a Group and optionally containing a hetero atom,
an acyl group optionally having any one or more substituents selected from the aforementioned a Group,
a silyl group optionally having any one or more substituents selected from the aforementioned a Group,
a phosphate group optionally having any one or more substituents selected from the aforementioned a Group,
a phosphate group protected by a protecting group in nucleic acid synthesis, or a group represented by —P(R$^5$)R$^6$ wherein R$^5$ and R$^6$ are each independently a hydroxy group, a hydroxy group protected by a protecting group in nucleic acid synthesis, a mercapto group, a mercapto group protected by a protecting group in nucleic acid synthesis, an amino group, a straight chain or branched chain alkoxy group having 1 to 6 carbon atoms, a straight chain or branched chain alkylthio group having 1 to 6 carbon atoms, a cyanoalkoxy group having 1 to 6 carbon atoms, or an aralkyl group including a straight chain or branched chain alkylamino group having 1 to 6 carbon atoms, an alkyl group having 1 to 7 carbon atoms and optionally branched or forming a ring, an alkenyl group having 2 to 7 carbon atoms and optionally branched or forming a ring, an alkynyl group having 2 to 7 carbon atoms and optionally branched or forming a ring, and an aryl group having 3 to 12 carbon atoms and optionally containing a hetero atom.

X is an oxygen atom or a sulfur atom.

Preferably, all of R$^1$, R$^2$, R$^3$, and R$^4$ are not hydrogen atoms.

In the above-mentioned formula (I), Base is preferably a purin-9-yl group or a 2-oxo-1,2-dihydropyrimidin-1-yl group.

Preferably, in the above-mentioned formula (I), R$^1$ is a hydrogen atom, and R$^2$ is an alkyl group having 1 to 3 carbon atoms.

Preferably, in the above-mentioned formula (I),
R$^3$ is
a hydrogen atom,
a hydroxy-protecting group in nucleic acid synthesis,
an alkyl group having 1 to 7 carbon atoms and optionally branched or forming a ring,
an alkenyl group having 2 to 7 carbon atoms and optionally branched or forming a ring,
an aryl group having 3 to 12 carbon atoms, which optionally has any one or more substituents selected from the aforementioned a Group and which optionally contains a hetero atom,
an aralkyl group having an aryl moiety having 3 to 12 carbon atoms which moiety optionally having any one or more substituents selected from the aforementioned a Group and optionally containing a hetero atom,
an acyl group optionally having any one or more substituents selected from the aforementioned a Group,
a silyl group optionally having any one or more substituents selected from the aforementioned a Group,
a phosphate group optionally having any one or more substituents selected from the aforementioned a Group, or
a phosphate group protected by a protecting group in nucleic acid synthesis, and
R$^4$ is a group represented by —P (R$^5$) R$^6$ wherein R$^5$ and R$^6$ are each independently a hydroxy group, a hydroxy group protected by a protecting group in nucleic acid synthesis, a mercapto group, a mercapto group protected by a protecting group in nucleic acid synthesis, an amino group, a straight chain or branched chain alkoxy group having 1 to 6 carbon atoms, a straight chain or branched chain alkylthio group having 1 to 6 carbon atoms, a cyanoalkoxy group having 1 to 6 carbon atoms, or a straight chain or branched chain alkylamino group having 1 to 6 carbon atoms.

In the above-mentioned formula (I), X is preferably an oxygen atom.

A certain invention described in the present specification relates to an oligonucleotide having at least one nucleoside structure represented by the following formula (II), a pharmaceutically acceptable salt thereof, or a pharmaceutically acceptable solvate thereof.

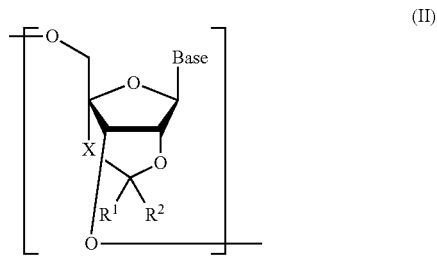

(II)

In the formula (II),

Base shows a purin-9-yl group or a 2-oxo-1,2-dihydropyrimidin-1-yl group optionally having any one or more substituents selected from an α Group, wherein the α Group is composed of a hydroxy group, a hydroxy group protected by a protecting group in nucleic acid synthesis, a straight chain alkyl group having 1 to 6 carbon atoms, a straight chain alkoxy group having 1 to 6 carbon atoms, a mercapto group, a mercapto group protected by a protecting group in nucleic acid synthesis, a straight chain alkylamino group having 1 to 6 carbon atoms, an amino group, a straight chain alkylamino group having 1 to 6 carbon atoms, an amino group protected by a protecting group in nucleic acid synthesis, and a halogen atom;

R$^1$ and R$^2$ are each independently
a hydrogen atom or
an alkyl group having 1 to 7 carbon atoms, which is optionally branched or forming a ring, and unsubstituted or substituted by a hydroxy group, a mercapto group, an alkoxy group having 1 to 6 carbon atoms, or an alkylthio group having 1 to 6 carbon atoms; and X is an oxygen atom or a sulfur atom.

In the above-mentioned formula (II), Base is preferably a purin-9-yl group or a 2-oxo-1,2-dihydropyrimidin-1-yl group.

Preferably, in the above-mentioned formula (II), R$^1$ is a hydrogen atom and R$^2$ is an alkyl group having 1 to 3 carbon atoms. Preferably, both R$^1$ and R$^2$ are not hydrogen atoms.

In the above-mentioned formula (II), X is preferably an oxygen atom.

Advantageous Effects of Invention

According to the above-mentioned invention, novel nucleosides and nucleotides are provided. Oligonucleotides containing this nucleotide have a binding affinity for single-stranded RNA and single-stranded DNA comparable to that of conventional oligonucleotides including 2',4'-bridged artificial nucleotides. The oligonucleotide of the present invention is expected to be applicable, for example, to nucleic acid medicine. The 2',4'-bridged nucleosides and nucleotides of the present invention can introduce a hetero atom into the 6'-position in a bridged 6-membered ring structure and can be produced through a simpler reaction process than conventional methods. It is therefore also possible to further increase industrial production efficiency.

BRIEF DESCRIPTION OF DRAWINGS

FIG. 1 is a graph replacing a drawing showing the results of an enzyme resistant ability experiment.

DESCRIPTION OF EMBODIMENTS

Hereinafter, the embodiments for carrying out the present invention are described using the drawing. The present invention is not limited to the embodiments described below, but also includes appropriate modifications from the following embodiments within the scope obvious to those skilled in the art.

A certain invention described in the present specification relates to a compound represented by the above-mentioned formula (I), a pharmaceutically acceptable salt thereof, or a pharmaceutically acceptable solvate thereof, an oligonucleotide having at least one nucleoside structure represented by the above-mentioned formula (II), a pharmaceutically acceptable salt thereof, or a pharmaceutically acceptable solvate thereof.

In the present specification, the term "straight chain alkyl group having 1 to 6 carbon atoms" refers to any straight chain alkyl group having 1 to 6 carbon atoms, specifically a methyl group, an ethyl group, an n-propyl group, an n-butyl group, an n-pentyl group, or an n-hexyl group.

In the present specification, the term "straight chain alkoxy group having 1 to 6 carbon atoms" encompasses an alkoxy group having any straight chain alkyl group having 1 to 6 carbon atoms. Examples thereof include methyloxy group, ethyloxy group, n-propyloxy group, and the like. In the present specification, the term "straight chain or branched chain alkoxy group having 1 to 6 carbon atoms" encompasses an alkoxy group having any straight chain or branched chain alkyl group having 1 to 6 carbon atoms. Examples thereof include methyloxy group, ethyloxy group, n-propyloxy group, isopropyloxy group, n-butyloxy group, isobutyl oxy group, tert-butyloxy group, n-pentyloxy group, isopentyloxy group, and the like.

In the present specification, the term "straight chain alkylthio group having 1 to 6 carbon atoms" encompasses an alkylthio group having any straight chain alkyl group having 1 to 6 carbon atoms. Examples thereof include methylthio group, ethylthio group, n-propylthio group, and the like. In the present specification, the term "straight chain or branched chain alkylthio group having 1 to 6 carbon atoms" encompasses an alkylthio group having any straight chain or branched chain alkyl group having 1 to 6 carbon atoms. Examples thereof include methylthio group, ethylthio group, n-propylthio group, isopropylthio group, n-butylthio group, isobutyl thio group, tert-butylthio group, n-pentylthio group, isopentylthio group, and the like.

In the present specification, the term "cyanoalkoxy group having 1 to 6 carbon atoms" refers to a group in which at least one hydrogen atom constituting the above-mentioned straight chain alkoxy group having 1 to 6 carbon atoms is substituted by a cyano group.

In the present specification, the term "straight chain alkylamino group having 1 to 6 carbon atoms" encompasses a group in which one or two hydrogen atoms constituting amino group is/are substituted by a straight chain alkyl group having 1 to 6 carbon atoms. Examples thereof include methylamino group, dimethylamino group, ethylamino group, methylethylamino group, diethylamino group, and the like. In the present specification, the term "straight chain or branched chain alkylamino group having 1 to 6 carbon atoms" encompasses a group in which one or two hydrogen atoms constituting amino group is/are substituted by a straight chain or branched chain alkyl group having 1 to 6 carbon atoms. Examples thereof include methylamino group, dimethylamino group, ethylamino group, methylethylamino group, diethylamino group, n-propylamino group, di(n-propyl)amino group, isopropylamino group, diisopropylamino group, and the like.

In the present specification, the term "alkyl group having to 7 carbon atoms and optionally branched or forming a ring" encompasses any straight chain alkyl group having 1 to 7 carbon atoms, any branched chain alkyl group having 3 to 7 carbon atoms, and any cyclic alkyl group having 3 to 7 carbon atoms. It is sometimes simply referred to as a "lower alkyl group". Examples of any straight chain alkyl group having 1 to 7 carbon atoms include methyl group, ethyl group, n-propyl group, n-butyl group, n-pentyl group, n-hexyl group, and n-heptyl group; examples of any branched chain alkyl group having 3 to 7 carbon atoms include isopropyl group, isobutyl group, tert-butyl group, isopentyl group, and the like, and examples of any cyclic alkyl group having 3 to 7 carbon atoms include cyclobutyl group, cyclopentyl group, cyclohexyl group, and the like.

In the present specification, the term "alkenyl group having 2 to 7 carbon atoms and optionally branched or forming a ring" encompasses any straight chain alkenyl group having 2 to 7 carbon atoms, any branched chain alkenyl group having 3 to 7 carbon atoms, and any cyclic alkenyl group having 3 to 7 carbon atoms. It is sometimes simply referred to as a "lower alkenyl group". Examples of any straight chain alkenyl group having 2 to carbon atoms include ethenyl group, 1-propenyl group, 2-propenyl group, 1-butenyl group, 2-butenyl group, 1-pentenyl group, 2-pentenyl group, 3-pentenyl group, 4-pentenyl group, 1-hexenyl group, and the like; examples of any branched chain alkenyl group having 3 to 7 carbon atoms include isopropenyl group, 1-methyl-1-propenyl group, 1-methyl-2-propenyl group, 2-methyl-1-propenyl group, 2-methyl-2-propenyl group, 1-methyl-2-butenyl group, and the like, and examples of any cyclic alkenyl group having 3 to 7 carbon atoms include cyclobutenyl group, cyclopentenyl group, cyclohexenyl group, and the like. In the present specification, the term "alkenyl group having 2 to 7 carbon atoms and optionally branched or forming a ring" encompasses any straight chain alkenyl group having 2 to 7 carbon atoms, any branched chain alkenyl group having 3 to 7 carbon atoms, and any cyclic alkenyl group having 3 to 7 carbon atoms. It is sometimes simply referred to as "lower alkenyl group". Examples of any straight chain alkenyl group having 2 to carbon atoms include ethenyl group, 1-propenyl group, 2-propenyl group, 1-butenyl group, 2-butenyl group, 1-pentenyl group, 2-pentenyl group, 3-pentenyl group, 4-pentenyl group, 1-hexenyl group, and the like; examples of any branched chain alkenyl group having 3 to 7 carbon atoms include isopropenyl group, 1-methyl-1-propenyl group, 1-methyl-2-propenyl group, 2-methyl-1-propenyl group, 2-methyl-2-propenyl group, 1-methyl-2-butenyl group, and the like; and examples of any cyclic alkenyl group having 3 to 7 carbon atoms include cyclobutenyl group, cyclopentenyl group, cyclohexenyl group, and the like.

In the present specification, the term "alkynyl group" means any alkyl or alkenyl defined above, which further contains at least one triple bond between the adjacent carbons. The representative linear and branched chain alkynyls include acetylenyl, propynyl, 1-butynyl, 2-butynyl, 1-pentynyl, 2-pentynyl, and 3-methyl-1butynyl.

In the present specification, the term "aryl group having to 12 carbon atoms and optionally containing a hetero atom" encompasses any aryl group having 6 to 12 carbon atoms and consisting of hydrocarbon alone, and any heteroaryl group having to 12 carbon atoms in which at least one carbon atom constituting the ring structure of the aryl group is substituted by a hetero atom (e.g., nitrogen atom, oxygen atom, sulfur atom, and combination of these). Examples of the aryl group having 6 to 12 carbon atoms include phenyl group, naphthyl group, indenyl group, azulenyl group, and the like, and examples of any heteroaryl group having 3 to 12 carbon atoms include pyridyl group, pyrrolyl group, quinolyl group, indolyl group, imidazolyl group, furyl group, thienyl group, and the like.

In the present specification, examples of the term "aralkyl group having an aryl moiety having 3 to 12 carbon atoms and optionally having a hetero atom" include benzyl group, phenethyl group, naphthylmethyl group, 3-phenylpropyl group, 2-phenylpropyl group, 4-phenylbutyl group, 2-phenylbutyl group, pyridylmethyl group, indolylmethyl group, furylmethyl group, thienylmethyl group, pyrrolylmethyl group, 2-pyridylethyl group, 1-pyridylethyl group, 3-thienylpropyl group, and the like.

In the present specification, examples of the term "acyl group" include aliphatic acyl group and aromatic acyl group. Specific examples of the aliphatic acyl group include formyl group, alkylcarbonyl groups such as acetyl group, propionyl group, butyryl group, isobutyryl group, pentanoyl group, pivaloyl group, valeryl group, isovaleryl group, octanoyl group, nonanoyl group, decanoyl group, 3-methylnonanoyl group, 8-methylnonanoyl group, 3-ethyloctanoyl group, 3,7-dimethyloctanoyl group, undecanoyl group, dodecanoyl group, tridecanoyl group, tetradecanoyl group, pentadecanoyl group, hexadecanoyl group, 1-methylpentadecanoyl group, 14-methylpentadecanoyl group, 13,13-dimethyltetradecanoyl group, heptadecanoyl group, 15-methylhexadecanoyl group, octadecanoyl group, 1-methylheptadecanoyl group, nonadecanoyl group, eicosanoyl group, and heneicosanoyl group; carboxylated alkylcarbonyl groups such as succinoyl group, glutaroyl group, and adipoyl group; halogeno lower alkylcarbonyl groups such as chloroacetyl group, dichloroacetyl group, trichloroacetyl group, and trifluoroacetyl group; lower alkoxy lower alkylcarbonyl groups such as methoxyacetyl group; unsaturated alkylcarbonyl groups such as (E)-2-methyl-2-butenoyl group. Examples of the aromatic acyl group include arylcarbonyl groups such as benzoyl group, α-naphthoyl group, and R-naphthoyl group; halogeno arylcarbonyl groups such as 2-bromobenzoyl group and 4-chlorobenzoyl group; lower alkylated arylcarbonyl groups such as 2,4,6-trimethylbenzoyl group and 4-toluoyl group; lower alkoxylated arylcarbonyl groups such as 4-anisoyl group; carboxylated arylcarbonyl groups such as 2-carboxybenzoyl group, 3-carboxybenzoyl group, and 4-carboxybenzoyl group; nitrated arylcarbonyl groups such as 4-nitrobenzoyl group and 2-nitrobenzoyl group; lower alkoxycarbonylated arylcarbonyl groups such as 2-(methoxycarbonyl)benzoyl group; arylated arylcarbonyl groups such as 4-phenylbenzoyl group, and the like. It is preferably formyl group, acetyl group, propionyl group, butyryl group, isobutyryl group, pentanoyl group, pivaloyl group, or benzoyl group.

In the present specification, examples of the term "silyl group" include tri-lower alkylsilyl groups such as trimethylsilyl group, triethylsilyl group, isopropyldimethylsilyl group, t-butyldimethylsilyl group, methyldiisopropyl silyl group, methyl-di-t-butylsilyl group, and triisopropyl silyl group; tri-lower alkylsilyl groups substituted by 1 or 2 aryl groups such as diphenylmethylsilyl group, butyldiphenylbutylsilyl group, diphenylisopropylsilyl group, and phenyldiisopropyl silyl group, and the like. It is preferably trimethylsilyl group, triethylsilyl group, triisopropyl silyl group, t-butyldimethylsilyl group, or t-butyldiphenylsilyl group, further preferably trimethylsilyl group.

In the present specification, examples of the term "halogen atom" include fluorine atom, chlorine atom, bromine atom, and iodine atom. It is preferably a fluorine atom or a chlorine atom.

In the present specification, the "protecting group" of the terms "amino-protecting group in nucleic acid synthesis", "hydroxy-protecting group in nucleic acid synthesis", "hydroxy group protected by a protecting group in nucleic acid synthesis", "phosphate group protected by a protecting group in nucleic acid synthesis", and "mercapto group protected by a protecting group in nucleic acid synthesis" is not particularly limited as long as it can stably protect an amino group, a hydroxy group, a phosphate group, or a mercapto group during nucleic acid synthesis. Specifically, it refers to a protecting group that is stable under acidic or neutral conditions and can be cleaved by chemical methods such as hydrogenolysis, hydrolysis, electrolysis, and photolysis. Examples of such protecting group include lower alkyl group, lower alkenyl group, acyl group, tetrahydropyranyl or tetrahydrothiopyranyl group, tetrahydrofuranyl or tetrahydrothiofuranyl group, silyl group, lower alkoxymethyl group, lower alkoxylated lower alkoxymethyl group, halogeno lower alkoxymethyl group, lower alkoxylated ethyl group, halogeno ethyl group, methyl group substituted by 1 to 3 aryl groups, "methyl group substituted by 1 to 3 aryl groups in which the aryl ring is substituted by lower alkyl group, lower alkoxy group, halogen atom, or cyano group", lower alkoxycarbonyl group, "aryl group substituted by halogen atom, lower alkoxy group, or nitro group", "lower alkoxycarbonyl group substituted by halogen atom or tri-lower alkylsilyl group", alkenyloxycarbonyl group, "aralkyloxycarbonyl group in which the aryl ring is optionally substituted by lower alkoxy or nitro group", and the like.

More specific examples of the tetrahydropyranyl group or tetrahydrothiopyranyl group include tetrahydropyran-2-yl group, 3-bromotetrahydropyran-2-yl group, 4-methoxytetrahydropyran-4-yl group, tetrahydrothiopyran-4-yl group, 4-methoxytetrahydrothiopyran-4-yl group, and the like. Examples of the tetrahydrofuranyl group or tetrahydrothiofuranyl group include tetrahydrofuran-2-yl group and tetrahydrothiofuran-2-yl group. Examples of the lower alkoxymethyl group include methoxymethyl group, 1,1-dimethyl-1-methoxymethyl group, ethoxymethyl group, propoxymethyl group, isopropoxymethyl group, butoxymethyl group, t-butoxymethyl group, and the like. Examples of the lower alkoxylated lower alkoxymethyl group include 2-methoxyethoxymethyl group and the like. Examples of the halogeno lower alkoxymethyl group include 2,2,2-trichloroethoxymethyl group, bis(2-chloroethoxy)methyl group, and the like. Examples of the lower alkoxylated ethyl group include 1-ethoxyethyl group, 1-(isopropoxy)ethyl group, and the like. Examples of the halogeno ethyl group include 2,2,2-trichloroethyl group and the like. Examples of the methyl group substituted by 1 to 3 aryl groups include benzyl group, α-naphthylmethyl group, β-naphthylmethyl group, diphenylmethyl group, triphenyl methyl group, α-naphthyldiphenylmethyl group, 9-anthrylmethyl group, and the like. Examples of the "methyl group substituted by 1 to aryl groups in which the aryl ring is substituted by lower alkyl group, lower alkoxy group, halogen atom, or cyano group" include 4-methylbenzyl group, 2,4,6-trimethyl benzyl group, 3,4,5-trimethyl benzyl group, 4-methoxybenzyl group, 4-methoxyphenyldiphenylmethyl group, 4,4'-dimethoxytriphenyl methyl group, 2-nitrobenzyl group, 4-nitrobenzyl group, 4-chlorobenzyl group, 4-bromobenzyl group, 4-cyanobenzyl group, and the like. Examples of the lower alkoxycarbonyl group include methoxycarbonyl group, ethoxycarbonyl group, t-butoxycarbonyl group, isobutoxycarbonyl group, and the like. Examples of the "aryl group substituted by halogen atom, lower alkoxy group, or nitro group" include 4-chlorophenyl group, 2-fluorophenyl group, 4-methoxyphenyl group, 4-nitrophenyl group, 2,4-di nitrophenyl group, and the like. Examples of the "lower alkoxycarbonyl group substituted by halogen atom or tri-lower alkylsilyl group" include 2,2,2-trichloroethoxycarbonyl group, 2-trimethylsilyl ethoxycarbonyl group, and the like. Examples of the alkenyloxycarbonyl group include vinyloxycarbonyl group, aryloxycarbonyl group, and the like. Examples of the "aralkyloxycarbonyl group in which the aryl ring is optionally substituted by lower alkoxy or nitro group include benzyloxycarbonyl group, 4-methoxybenzyloxycarbonyl group, 3,4-dimethoxybenzyloxycarbonyl group, 2-nitrobenzyloxycarbonyl group, 4-nitrobenzyloxycarbonyl group, and the like.

The "hydroxy-protecting group in nucleic acid synthesis" is preferably an aliphatic acyl group, an aromatic acyl group, a methyl group substituted by 1 to 3 aryl groups, a "methyl group substituted by 1 to 3 aryl groups in which the aryl ring is substituted by lower alkyl, lower alkoxy, halogen, or cyano group", or a silyl group, further preferably an acetyl group, a benzoyl group, a benzyl group, a p-methoxybenzoyl group, a dimethoxytrityl group, a mono methoxytrityl group, or a tert-butyldiphenylsilyl group. The protecting group of the "hydroxy group protected by a protecting group in nucleic acid synthesis" is preferably an aliphatic acyl group, an aromatic acyl group, a "methyl group substituted by 1 to 3 aryl groups", an "aryl group substituted by halogen atom, lower alkoxy group, or a nitro group", a lower alkyl group, or a lower alkenyl group, further preferably a benzoyl group, a benzyl group, a 2-chlorophenyl group, a 4-chlorophenyl group, or a 2-propenyl group. The "amino-protecting group in nucleic acid synthesis" is preferably an acyl group, further preferably a benzoyl group. The "protecting group" of the "phosphate group protected by a protecting group in nucleic acid synthesis" is preferably a lower alkyl group, a lower alkyl group substituted by a cyano group, an aralkyl group, an "aralkyl group in which aryl ring is substituted by nitro group or halogen atom", or "an aryl group substituted by a lower alkyl group, a halogen atom, or a nitro group", further preferably a 2-cyanoethyl group, a 2,2,2-trichloroethyl group, a benzyl group, a 2-chlorophenyl group, or a 4-chlorophenyl group. The protecting group constituting the "phosphate group protected by a protecting group in nucleic acid synthesis" may be one or more. The protecting group constituting the "mercapto group protected by a protecting group in nucleic acid synthesis" is preferably an aliphatic acyl group or an aromatic acyl group, further preferably a benzoyl group.

In the present specification, the term "nucleoside" includes artificial nucleosides and nucleoside analogues, and refers to non-natural forms of "nucleosides" in which a purine or pyrimidine base and a sugar are bonded, and aromatic heterocycle and aromatic hydrocarbon ring other than purine and pyrimidine, which can be substituted for purine or pyrimidine bases, are linked to sugars. In the present specification, the nucleoside is preferably one in which the sugar moiety has non-natural sugar, particularly one having a ribose in which the carbon atoms at the 2'- and 4'-positions are bridged.

In the present specification, the term "oligonucleotide" includes artificial oligonucleotides and oligonucleotide analogs, in which two or more, the same or different "nucleosides" are linked by "natural and non-natural phosphorus-containing linking groups, for example, phosphodiester bond, phosphorothioate group, alkylphosphonate bond, phosphorodiamidate bond, boranophosphate bond, and the like. It is preferably one in which 2 to 100, more preferably 5 to 50, artificial nucleotides are linked, or one that forms a double strand with these complementary strands.

In the present specification, the term "pharmacologically acceptable salt thereof" means a pharmaceutically acceptable salt of a compound represented by the formula (I), or a pharmaceutically acceptable salt of an oligonucleotide having at least one nucleoside structure represented by the formula (II). Examples of such salt include metal salts such as alkali metal salts such as sodium salt, potassium salt, and lithium salt, alkaline earth metal salts such as calcium salt, magnesium salt, aluminum salt, iron salt, zinc salt, copper salt, nickel salt, cobalt salt, and the like; inorganic salts such as ammonium salt, amine salts such as organic salts and the like such as t-octylamine salt, dibenzyl amine salt, morpholine salt, glucosamine salt, phenylglycine alkyl ester salt, ethylenediamine salt, N-methylglucamine salt, guanidine salt, diethylamine salt, triethylamine salt, dicyclohexylamine salt, N,N'-dibenzyl ethylenediamine salt, chloroprocaine salt, procaine salt, diethanolamine salt, N-benzyl-phenethylamine salt, piperazine salt, tetramethylammonium salt, tris (hydroxymethyl)aminomethane salt; inorganic acid salts such as hydrohalogenic acid salt such as hydrofluoric acid salt, hydrochloric acid salt, hydrobromic acid salt, and hydroiodic acid salt, nitric acid salt, perchloric acid salt, sulfuric acid salt, phosphoric acid salt, and the like; organic acid salts such as lower alkane sulfonic acid salts such as methanesulfonic acid salt, trifluoromethanesulfonic acid salt, ethanesulfonic acid salt, arylsulfonic acid salts such as benzenesulfonic acid salt, p-toluenesulfonic acid salt, acetate, malate, fumarate, succinate, citrate, tartrate, oxalate, maleate, and the like; and amino acid salts such as glycine salt, lysine salt, arginine salt, ornithine salt, glutamate, and aspartate.

A pharmaceutically acceptable solvate thereof means, for example, a pharmaceutically acceptable solvate of a compound represented by the formula (I), or a pharmaceutically acceptable solvate of an oligonucleotide having at least one nucleoside structure represented by the formula (II). Examples of the solvate include hydrates.

The "Base" is, for example, a purine base (that is, purin-9-yl group) or a pyrimidine base (that is, 2-oxo-1,2-dihydropyrimidin-1-yl group). These bases optionally have any one or more substituents selected from α Group consisting of a hydroxy group, a straight chain alkyl group having 1 to 6 carbon atoms, a straight chain alkoxy group having 1 to 6 carbon atoms, a mercapto group, a straight chain alkylamino group having 1 to carbon atoms, an amino group, straight chain alkylamino group having 1 to 6 carbon atoms, and a halogen atom.

Specific examples of the above-mentioned "Base" include 6-aminopurin-9-yl group (adeninyl group), 2,6-diaminopurin-9-yl group, 2-amino-6-chloropurin-9-yl group, 2-amino-6-fluoropurin-9-yl group, 2-amino-6-bromopurin-9-yl group, 2-amino-6-hydroxypurin-9-yl group (guaninyl group), 6-amino-2-methoxypurin-9-yl group, 6-amino-2-chloropurin-9-yl group, 6-amino-2-fluoropurin-9-yl group, 2,6-dimethoxypurin-9-yl group, 2,6-dichloropurin-9-yl group, 6-mercaptopurin-9-yl group, 2-oxo-4-amino-1,2-dihydropyrimidin-1-yl group (cytosinyl group), 4-amino-2-oxo-5-fluoro-1,2-dihydropyrimidin-1-yl group, 4-amino-2-oxo-5-chloro-1,2-dihydropyrimidin-1-yl group, 2-oxo-4-methoxy-1,2-dihydropyrimidin-1-yl group, 2-oxo-4-mercapto-1,2-dihydropyrimidin-1-yl group, 2-oxo-4-hydroxy-1,2-dihydropyrimidin-1-yl group (uracilyl group), 2-oxo-4-hydroxy-5-methyl-1,2-dihydropyrimidin-1-yl group (thyminyl group), and 4-amino-5-methyl-2-oxo-1,2-dihydropyrimidin-1-yl group.

Particularly, from the aspect of introduction into nucleic acid medicines, the "Base" is preferably a 2-oxo-4-hydroxy-5-methyl-1,2-dihydropyrimidin-1-yl group (thyminyl group), a 2-oxo-4-amino-1,2-dihydropyrimidin-1-yl group (cytosinyl group), a 6-aminopurin-9-yl group (adeninyl group), a 2-amino-6-hydroxypurin-9-yl group (guaninyl group), a 4-amino-5-methyl-2-oxo-1,2-dihydropyrimidin-1-yl group, or a 2-oxo-4-hydroxy-1,2-dihydropyrimidin-1-yl group (uracilyl group), particularly preferably a 2-oxo-4-hydroxy-5-methyl-1,2-dihydropyrimidin-1-yl group (thyminyl group). It is preferred that the hydroxy group and amino group are protected by protective groups during the synthesis of oligonucleotides.

The oligonucleotide of the present invention has at least one nucleoside structure mentioned above at any position. The position and number thereof are not particularly limited and can be appropriately designed according to the purposes.

A compound represented by the above-mentioned formula (I), a pharmaceutically acceptable salt thereof, or a pharmaceutically acceptable solvate thereof, an oligonucleotide having at least one nucleoside structure represented by the above-mentioned formula (II), a pharmaceutically acceptable salt thereof, or a pharmaceutically acceptable solvate thereof can be obtained by reference to the below-mentioned Examples, as well as known methods (e.g., the method described in JP-B-6562517).

Oligonucleotide analogs (antisense molecules) containing such nucleoside structure show a striking improvement in enzyme resistance compared with, for example, the use of conventional EoNA. In addition, they have single-stranded RNA (ssRNA) binding affinity exceeding that of EoNA.

From the above, a pharmaceutically acceptable solvate of a compound represented by the formula (I), or a pharmaceutically acceptable solvate of an oligonucleotide having at least one nucleoside structure represented by the formula (II) (oligonucleotide analog) is expected to show usefulness as a pharmaceutical product (antisense molecule) that treats diseases by inhibiting the action of a specific gene, such as antitumor agent and antiviral agent.

In particular, the antisense method requires both binding affinity for complementary sense strand RNA and resistance to in vivo deoxyribonuclease. It is generally known that, in a single-stranded state, the structure of the sugar moiety of nucleic acids constantly oscillates between a form close to a DNA duplex and a form close to a DNA-RNA duplex or RNA double-strand. When a single-stranded nucleic acid forms a double strand with a complementary RNA strand, the structure of the sugar moiety thereof is fixed. In the 2',4'-bridged nucleoside of the present invention, since the sugar moiety is fixed in advance in the state of forming a double strand, a double strand with the RNA strand of interest is easily formed and can exist stably. It is also known that nucleic acid double strands are stabilized by chains of hydration water, called a network of water molecules.

The oligonucleotide analogs of the present invention can be prepared into parenteral administration preparation or liposome preparation by blending with additives generally used in the field of pharmaceutical formulation technology, such as excipient, binder, antiseptic, oxidation stabilizer, disintegrant, lubricant, corrigent, and the like. In addition, topical formulations such as liquid, cream, ointment, and the like can be prepared by blending with pharmaceutical carriers generally used in the pertinent technical field.

The administration methods and preparations of antisense oligonucleotides are also disclosed in, for example, the following documents. WO 2004/016749, WO 2005/083124, WO 2007/143315, WO 2009/071680, WO 2013/089283.

Administration of the above-mentioned preparations depends on the severity and responsiveness of the pathology to be treated, and the course of treatment lasts from several days to several months, or until cure is achieved or remission of the disease state is achieved. The optimal dosing schedule can be calculated from the measurement of drug accumulation in the body. The artisan in the pertinent field can determine optimal dose, administration method, and repeat frequency. The optimal dose varies depending on the relative effect of individual antisense oligonucleotides, but can generally be calculated based on $IC_{50}$ or $EC_{50}$ in in vitro and in vivo animal experiments. For example, given the molecular weight of antisense oligonucleotide (derived from antisense oligonucleotide sequence and chemical structure) and, for example, effective dose such as $IC_{50}$ (determined experimentally), the dosage shown in mg/kg is calculated according to general practice.

That is, the present specification also provides a method for treating or a method for preventing a target disease, including a step of administering, to a subject, (1) a compound represented by the following formula (I), a pharmaceutically acceptable salt thereof, or a pharmaceutically acceptable solvate thereof, (2) an oligonucleotide having at least one nucleoside structure represented by the following formula (II), a pharmaceutically acceptable salt thereof, or a pharmaceutically acceptable solvate thereof, or (3) a medicament (preparation) containing same.

Example 1

Synthesis of Thymine Base Analogue

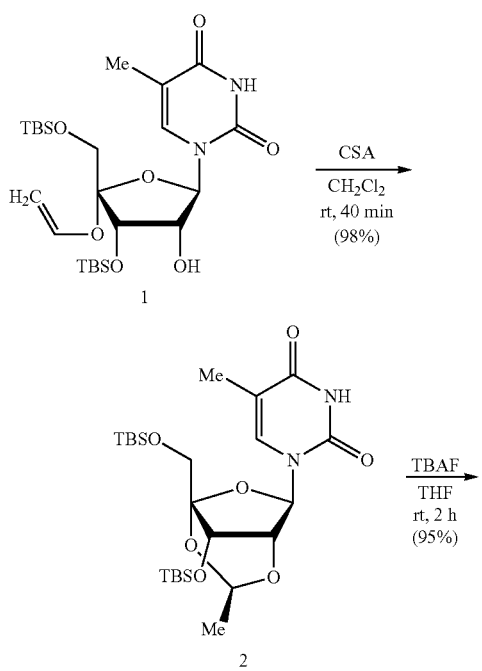

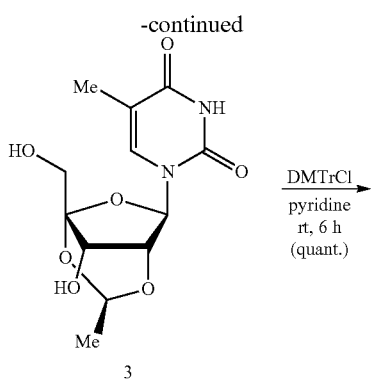

3

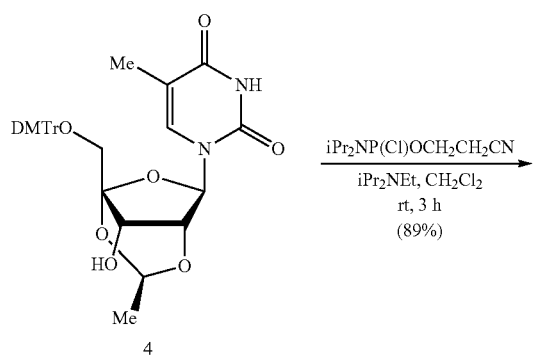

4

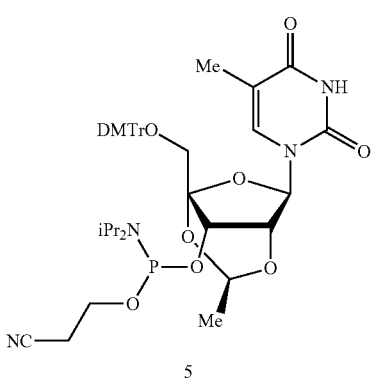

5

Compound 2: Under an argon stream, to an anhydrous methylene chloride solution (15 mL) of compound 1 (957 mg, 1.81 mmol) synthesized according to document (J. Org. Chem. 2019, 84, 13336-13344) was added 10-camphorsulfonic acid (21 mg, 0.09 mmol) at 0° C., and the mixture was stirred at room temperature for 40 min. After completion of the reaction, the reaction mixture was neutralized with saturated aqueous sodium hydrogen carbonate, and diluted with ethyl acetate (100 mL). The organic layer was washed twice with water, once with saturated brine, and dried over sodium sulfate. The solvent was evaporated under reduced pressure to give a crude product (956 mg). The crude product was purified by silica gel column chromatography (hexane/ethyl acetate=3:1) to give compound 2 (934 mg, yield 98%) as a white solid. 1H NMR (CDCl$_3$) δ: 0.08 (3H, s), 0.11 (3H, s), 0.14 (3H, s), 0.16 (3H, s), 0.93 (9H, s), 0.96 (9H, s), 1.39 (3H, d, J=5.0 Hz), 1.94 (3H, d, J=1.0 Hz), 3.79 (2H, s), 3.87 (1H, d, J=3.0 Hz), 4.26 (1H, d, J=3.0 Hz), 5.39 (1H, q, J=5.0 Hz), 6.16 (1H, s), 7.68 (1H, d, J=1.0 Hz), 8.55 (1H, brs). HRMS (ESI): Calcd for $C_{24}H_{44}N_2NaO_7Si_2$ [MNa$^+$]551.2585, found 551.2585.

Compound 3: To a tetrahydrofuran solution (9 mL) of compound 2 (162 mg, 0.31 mmol) was added tetrabutylammonium fluoride (1 M tetrahydrofuran solution, 0.64 mL, 0.64 mmol) at room temperature, and the mixture was stirred for 2 hr. After completion of the reaction, the solvent was evaporated under reduced pressure to give a crude product (304 mg). The crude product was purified by silica gel column chromatography (chloroform/methanol=20:1) to give compound 3 (87 mg, yield 95%) as a white solid. 1H NMR (CD$_3$OD) δ: 1.40 (3H, d, J=5.0 Hz), 1.86 (3H, d, J=1.0 Hz), 3.68, 3.73 (2H, AB, J=12.0 Hz), 3.91 (1H, d, J=3.0 Hz), 4.33 (1H, d, J=3.0 Hz), 5.46 (1H, q, J=5.0 Hz), 6.19 (1H, s), 8.02 (1H, q, J=1.0 Hz). HRMS (ESI): Calcd for $C_{12}H_{16}N_2NaO_7$ [MNa$^+$]323.0855, found 323.0858.

Compound 4: Under an argon stream, to an anhydrous pyridine solution (3 mL) of compound 3 (145 mg, 0.48 mmol) was added 4,4'-dimethoxytrityl chloride (489 mg, 1.44 mmol) at room temperature, and the mixture was stirred at room temperature for hr. After completion of the reaction, the reaction was quenched by adding methanol, and the mixture was stirred at room temperature for 30 min, and diluted with ethyl acetate. The organic layer was washed twice with water, once with saturated brine, and dried over sodium sulfate. The solvent was evaporated under reduced pressure to give a crude product (739 mg). The crude product was purified by silica gel column chromatography (chloroform/methanol=50:1-+20:1) to quantitatively give compound 4 (290 mg) as a white solid. 1H NMR (CDCl$_3$) δ: 1.28 (3H, s), 1.36 (3H, d, J=5.0 Hz), 3.10 (1H, d, J=11.0 Hz), 3.39, 3.48 (2H, AB, J=10.0 Hz), 3.76 (6H, s), 4.32 (1H, dd, J=3.0, 11.0 Hz), 4.48 (1H, d, J=3.0 Hz), 5.38 (1H, q, J=5 Hz), 6.22 (1H, s), 6.84 (4H, d, J=7.5 Hz), 7.19-7.45 (9H, m), 7.80 (1H, s), 10.03 (1H, brs). HRMS (ESI): Calcd for $C_{33}H_{34}N_2NaO_9$ [MNa$^+$]625.2162, found 625.2161.

Compound 5: Under an argon stream, to an anhydrous dichloromethane solution (2 mL) of compound 4 (96 mg, 0.16 mmol) was added N,N-diisopropyl ethylamine (0.42 mL, 2.4 mmol), 2-cyanoethyl N,N-diisopropylchlorophosphoramidite (0.18 mL, 0.8 mmol) was added dropwise at 0° C., and the mixture was stirred at room temperature for 3 hr. After completion of the reaction, the reaction mixture was quenched by adding saturated aqueous sodium hydrogen carbonate. After stirring at room temperature for 30 min, the mixture was diluted with ethyl acetate. The organic layer was washed once with water, once with saturated brine, and dried over sodium sulfate. The solvent was evaporated under reduced pressure to give a crude product (244 mg). The crude product was purified by silica gel column chromatography (hexane/ethyl acetate=1:1) to give compound 5 (114 mg, yield 89%) as a white solid. 1H NMR (CDCl$_3$) δ: 1.07-1.34 (18H, m), 2.34-2.46 (1H, m), 2.55-2.63 (1H, m), 3.35-3.40 (1H, m), 3.50-3.95 (11H, m), 4.29 (0.5H, dd, J=3.0, 7.0 Hz), 4.33 (0.5H, dd, J=3.0, 8.0 Hz), 4.58 (0.5H, d, J=3.0 Hz), 4.61 (0.5H, d, J=3.0 Hz), 5.36-5.42 (1H, m), 6.19 (0.5H, s), 6.20 (0.5H, s), 6.81-6.86 (4H, m), 7.23-7.42 (9H, m), 7.82 (0.5H, s), 7.83 (0.5H, s), 8.34 (1H, brs), 8.38 (1H, brs). $^{31}$P NMR (CDCl$_3$) δ: 149.4, 149.5. HRMS (ESI): Calcd for $C_{42}H_{51}N_4NaO_{10}P$ [MNa$^+$]825.3241, found 825.3243.

Synthesis of 5-Methylcytosine Base Analogue

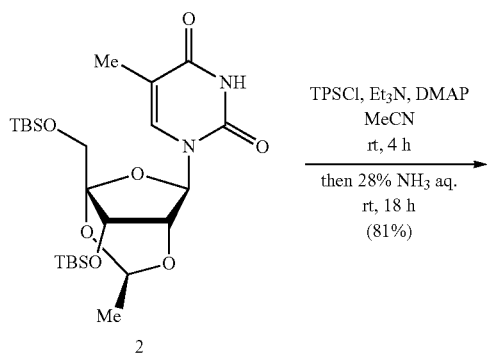

2

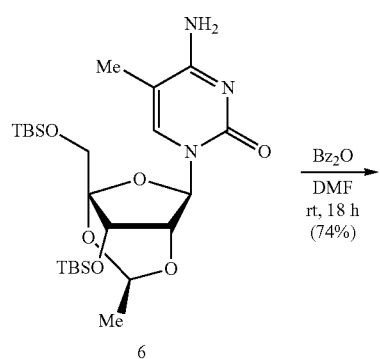

6

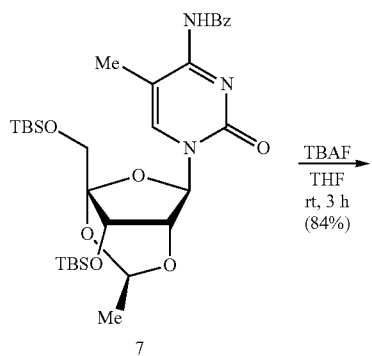

7

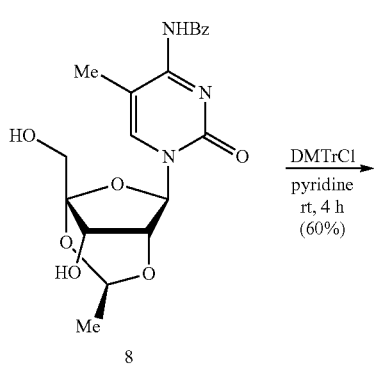

8

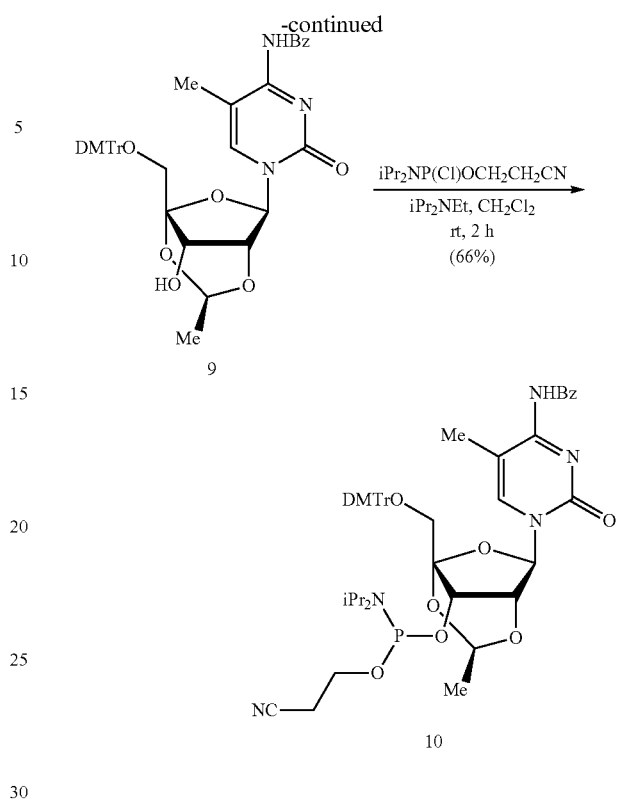

9

10

Compound 6: Under an argon stream, to an anhydrous acetonitrile solution (4 mL) of compound 2 (204 mg, 0.39 mmol) were added triethylamine (0.267 mL, 1.93 mmol), 2,4,6-triisopropylbenzenesulfonyl chloride (TPSCl) (198 mg, 0.66 mmol), and 4,4-dimethylaminopyridine (9.0 mg, 0.077 mmol) at room temperature, and the mixture was stirred at room temperature for hr. After completion of the reaction, 28% aqueous ammonia solution (2 mL) was added, and the mixture was further stirred at room temperature for 4 hr, and diluted with ethyl acetate. The organic layer was washed twice with water, once with saturated brine, and dried over sodium sulfate. The solvent was evaporated under reduced pressure to give a crude product (380 mg). The crude product was purified by silica gel column chromatography (chloroform/methanol=30:1 →10:1) to give compound 6 (164 mg, yield 81%) as a pale-brown solid. 1H NMR (CDCl$_3$) δ: 0.04 (3H, s), 0.08 (3H, s), 0.14 (3H, s), 0.17 (3H, s), 0.91 (9H, s), 0.96 (9H, s), 1.38 (3H, d, J=5.0 Hz), 1.95 (3H, s), 3.78 (2H, s), 3.82 (1H, d, J=3.0 Hz), 4.34 (1H, d, J=3.0 Hz), 5.42 (1H, q, J=5.0 Hz), 6.22 (1H, s), 7.73 (1H, brs). HRMS (MALDI): Calcd for $C_{24}H_{45}N_3NaO_6Si_2$ [MNa$^+$]550.2739, found 550.2728.

Compound 7: Under an argon stream, to an anhydrous dimethylformamide solution (1 mL) of compound 6 (54 mg, 0.10 mmol) was added benzoic anhydride (28 mg, 0.12 mmol) at room temperature, and the mixture was stirred at room temperature for hr. After completion of the reaction, and the mixture was diluted with ethyl acetate. The organic layer was washed twice with saturated aqueous sodium hydrogen carbonate:water (1:1), twice with water, once with saturated brine, and dried over sodium sulfate. The solvent was evaporated under reduced pressure to give a crude product (71 mg). The crude product was purified by silica gel column chromatography (chloroform/methanol=100:1) to give compound 7 (48 mg, yield 74%) as a white solid. 1H NMR (CDCl$_3$) δ: 0.08 (3H, s), 0.11 (3H, s), 0.16 (3H, s), 0.19 (3H, s), 0.93 (9H, s), 0.98 (9H, s), 1.40 (3H, d, J=5.0

Hz), 2.14 (3H, s), 3.81 (2H, s), 3.87 (1H, d, J=3.0 Hz), 4.32 (1H, d, J=3.0 Hz), 5.40 (1H, q, J=5.0 Hz), 6.20 (1H, s), 7.42-7.56 (3H, m), 7.85 (1H, s), 8.32 (1H, d, J=7.0 Hz). HRMS (MALDI): Calcd for $C_{31}H_{49}N_3NaO_7Si_2$ [MNa$^+$] 654.3001, found 654.3007.

Compound 8: To an tetrahydrofuran solution (4 mL) of compound 7 (84 mg, 0.16 mmol) was added tetrabutylammonium fluoride (1 M tetrahydrofuran solution, 0.35 mL, 0.35 mmol) at room temperature, and the mixture was stirred for 3 hr. After completion of the reaction, the solvent was evaporated under reduced pressure to give a crude product (179 mg). The crude product was dissolved in acetone, silica gel (300 mg) was added, and the solvent was evaporated again under reduced pressure. By dry charge, silica gel column chromatography (chloroform/ethyl acetate=2:1) was performed to give compound 8 (54 mg, yield 84%) as a white solid. 1H NMR (CD$_3$COCD$_3$) δ: 1.39 (3H, d, J=5.0 Hz), 2.07 (3H, s), 3.71-3.84 (2H, m), 4.00-4.11 (2H, m), 4.47 (1H, d, J=3.0 Hz), 4.95 (1H, t, J=5.5 Hz), 5.53 (1H, q, J=5.0 Hz), 6.28 (1H, s), 7.44-7.59 (3H, m), 8.29-8.33 (3H, m). HRMS (ESI): Calcd for $C_{19}H_{21}N_3NaO_7$ [MNa$^+$]426.1277, found 426.1277.

Compound 9: Under an argon stream, to an anhydrous pyridine solution (1 mL) of compound 8 (35 mg, 0.088 mmol) was added 4,4'-dimethoxytrityl chloride (51 mg, 0.15 mmol) at room temperature, and the mixture was stirred at room temperature for hr. After completion of the reaction, the reaction mixture was quenched by adding saturated aqueous sodium hydrogen carbonate, and diluted with ethyl acetate. The organic layer was washed twice with saturated aqueous sodium hydrogen carbonate, once with saturated brine, and dried over sodium sulfate. The solvent was evaporated under reduced pressure to give a crude product (97 mg). The crude product was purified by silica gel column chromatography (hexane/ethyl acetate=3:2) to give compound 9 (37 mg, yield 60%) as a white solid. 1H NMR (CDCl$_3$) δ: 1.39 (3H, d, J=5.0 Hz), 1.45 (3H, s), 2.65 (1H, brd, J=10.0 Hz), 3.41, 3.47 (2H, AB, J=10.5 Hz), 3.80 (3H, s), 3.81 (3H, s), 4.29 (1H, brm), 4.49 (1H, d, J=3.0 Hz), 5.39 (1H, q, J=5 Hz), 6.25 (1H, s), 6.85-6.89 (4H, m), 7.27-7.55 (12H, m), 7.94 (1H, s), 8.29 (1H, d, J=7.0 Hz). HRMS (ESI): Calcd for $C_{40}H_{39}N_3NaO_9$ [MNa$^+$]728.2584, found 727.2589.

Compound 10: Under an argon stream, to an anhydrous dichloromethane solution (1 mL) of compound 9 (37 mg, 0.052 mmol) was added N,N-diisopropyl ethylamine (0.14 mL, 0.79 mmol), 2-cyanoethyl N,N-diisopropylchlorophosphoramidite (0.059 mL, 0.26 mmol) was added dropwise at 0° C., and the mixture was stirred at room temperature for 2 hr. After completion of the reaction, the reaction mixture was quenched by adding saturated aqueous sodium hydrogen carbonate. After stirring at room temperature for 30 min, the mixture was diluted with ethyl acetate. The organic layer was washed once with water, once with saturated brine, and dried over sodium sulfate. The solvent was evaporated under reduced pressure to give a crude product (105 mg). The crude product was purified by silica gel column chromatography (hexane/ethyl acetate=2:1) to give compound 10 (31 mg, yield 66%) as a white solid. 1H NMR (CDCl$_3$) δ: 1.07-1.37 (18H, m), 2.34-2.62 (2H, m), 3.37-3.42 (1H, m), 3.51-3.90 (11H, m), 4.32-4.36 (1H, m), 4.62 (0.5H, d, J=3.0 Hz), 4.65 (0.5H, d, J=3.0 Hz), 5.39-5.42 (1H, m), 6.24 (0.5H, s), 6.25 (0.5H, s), 6.83-6.89 (4H, m), 7.27-7.54 (12H, m), 8.00 (1H, s), 8.29 (1H, d, J=8.0 Hz), 13.4 (1H, brs). $^{31}$P NMR (CDCl$_3$) δ: 149.6, 149.7. HRMS (ESI): Calcd for $C_{49}H_{57}N_5O_{10}P$ [MH$^+$]906.3843, found 906.3847.

Separate Synthesis of Thymine Base Analogue

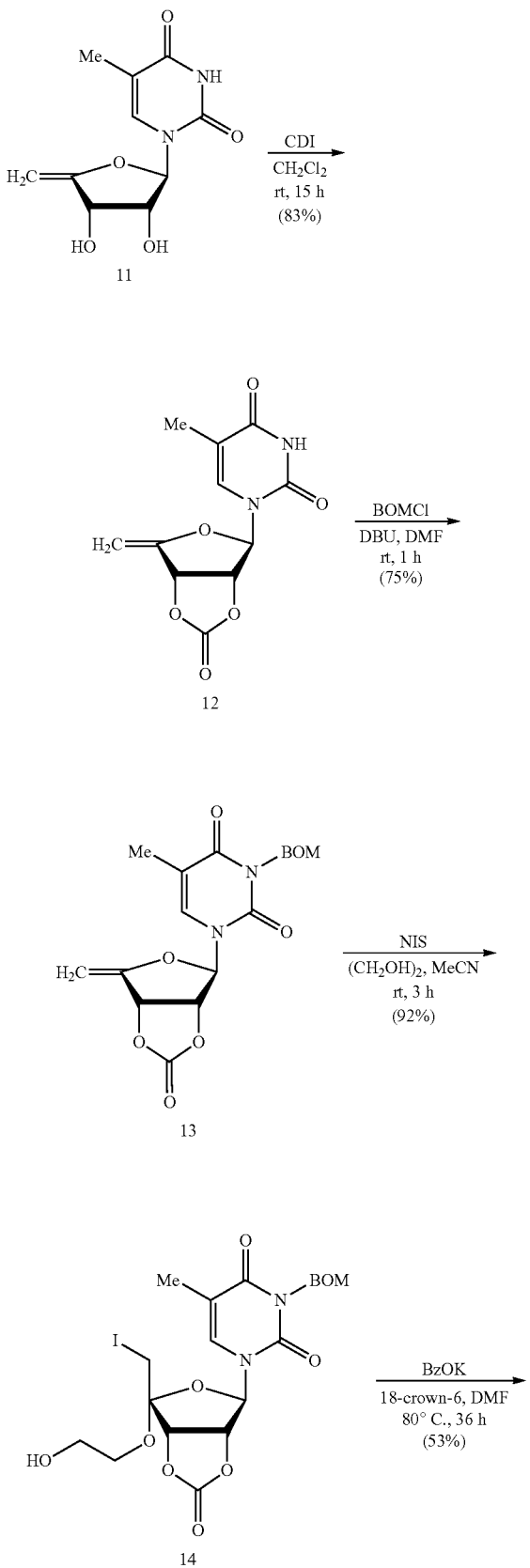

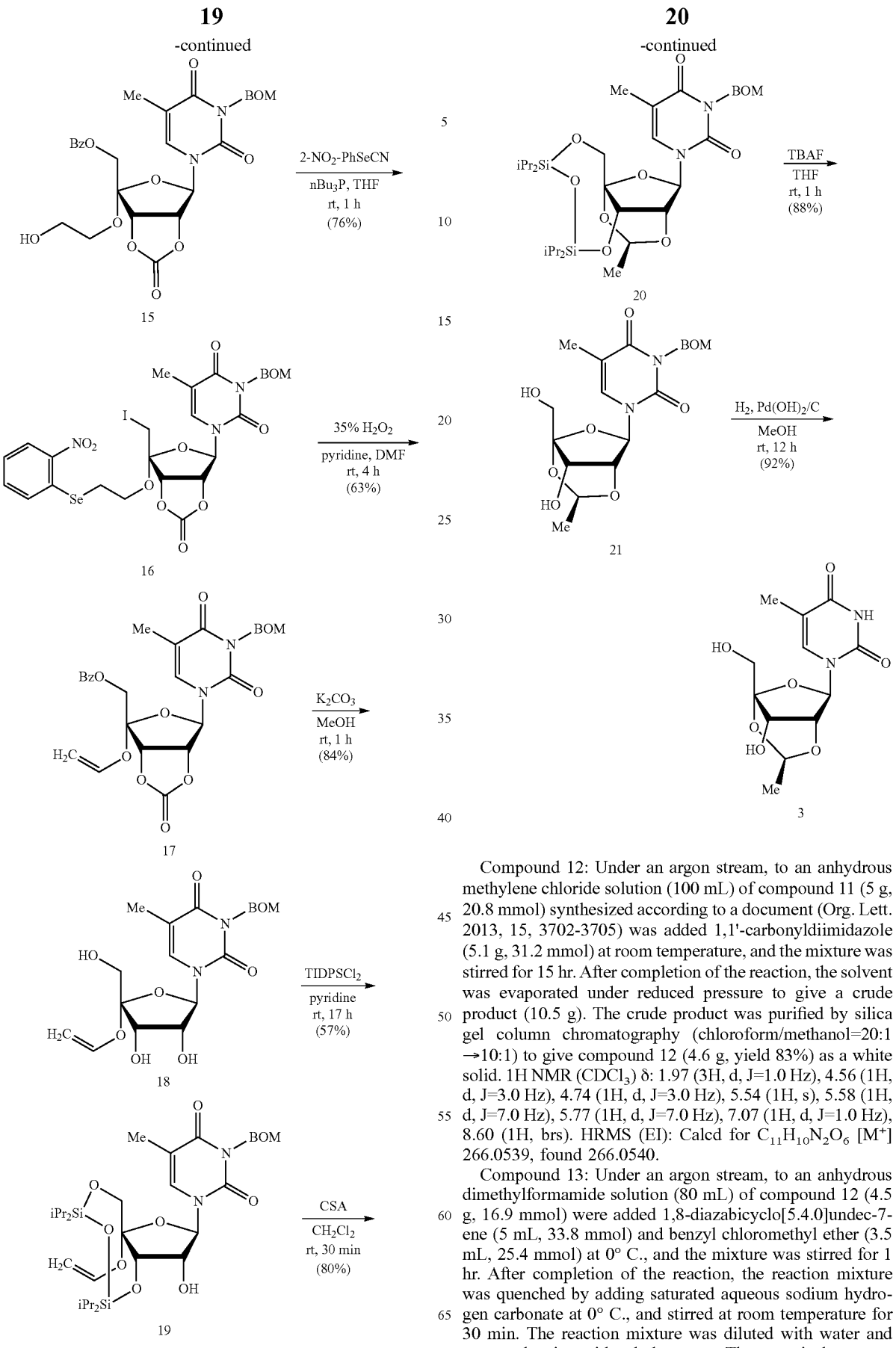

Compound 12: Under an argon stream, to an anhydrous methylene chloride solution (100 mL) of compound 11 (5 g, 20.8 mmol) synthesized according to a document (Org. Lett. 2013, 15, 3702-3705) was added 1,1'-carbonyldiimidazole (5.1 g, 31.2 mmol) at room temperature, and the mixture was stirred for 15 hr. After completion of the reaction, the solvent was evaporated under reduced pressure to give a crude product (10.5 g). The crude product was purified by silica gel column chromatography (chloroform/methanol=20:1 →10:1) to give compound 12 (4.6 g, yield 83%) as a white solid. 1H NMR (CDCl$_3$) δ: 1.97 (3H, d, J=1.0 Hz), 4.56 (1H, d, J=3.0 Hz), 4.74 (1H, d, J=3.0 Hz), 5.54 (1H, s), 5.58 (1H, d, J=7.0 Hz), 5.77 (1H, d, J=7.0 Hz), 7.07 (1H, d, J=1.0 Hz), 8.60 (1H, brs). HRMS (EI): Calcd for $C_{11}H_{10}N_2O_6$ [M$^+$] 266.0539, found 266.0540.

Compound 13: Under an argon stream, to an anhydrous dimethylformamide solution (80 mL) of compound 12 (4.5 g, 16.9 mmol) were added 1,8-diazabicyclo[5.4.0]undec-7-ene (5 mL, 33.8 mmol) and benzyl chloromethyl ether (3.5 mL, 25.4 mmol) at 0° C., and the mixture was stirred for 1 hr. After completion of the reaction, the reaction mixture was quenched by adding saturated aqueous sodium hydrogen carbonate at 0° C., and stirred at room temperature for 30 min. The reaction mixture was diluted with water and extracted twice with ethyl acetate. The organic layer was washed twice with water, once with saturated brine, and dried over sodium sulfate. The solvent was evaporated under reduced pressure to give a crude product (5.4 g). The crude product was purified by silica gel column chromatography (chloroform/methanol=100:1 →50:1) to give compound 13 (4.9 g, yield 75%) as a white solid. 1H NMR (CDCl$_3$) δ: 1.94 (3H, d, J=1.0 Hz), 4.56 (1H, d, J=3.0 Hz), 4.64 and 4.69 (2H, AB, J=12.5 Hz), 4.73 (1H, d, J=3.0 Hz), 5.40 and 5.46 (2H, AB, J=10.0 Hz), 5.48 (1H, s), 5.51 (1H, d, J=7.0 Hz), 5.81 (1H, d, J=7.0 Hz), 6.98 (1H, d, J=1.0 Hz), 7.26-7.38 (5H, m). HRMS (ESI): Calcd for C$_{19}$H$_{15}$N$_2$NaO$_7$ [MNa$^+$]409.1012, found 409.1009.

Compound 14: Under an argon stream, to an anhydrous acetonitrile solution (75 mL) of compound 13 (3 g, 7.76 mmol) was added ethylene glycol (1.3 mL, 23.3 mmol) at room temperature, N-iodosuccinimide (2.1 g, 9.32 mmol) was added at 0° C., and the mixture was stirred at room temperature for 3 hr. After completion of the reaction, the reaction mixture was quenched by adding saturated sodium thiosulfate aqueous solution, and the mixture was stirred at room temperature for 30 min. The solvent was evaporated under reduced pressure, and the residue was diluted with ethyl acetate. The organic layer was washed three times with water, once with saturated brine, and dried over sodium sulfate. The solvent was evaporated under reduced pressure to give a crude product (4.7 g). The crude product was purified by silica gel column chromatography (hexane/ethyl acetate=1:2) to give compound 14 (4.1 g, yield 92%) as a white foamy substance. 1H NMR (CDCl$_3$) δ: 1.91 (3H, d, J=1.0 Hz), 2.08 (1H, t, J=5.5 Hz), 3.42 and 3.54 (2H, AB, J=11.5 Hz), 3.62-3.86 (4H, m), 4.69 (2H, s), 5.38 (2H, s), 5.43 (1H, d, J=10.0 Hz), 5.49 (1H, d, J=10.0 Hz), 5.59 (1H, s), 7.00 (1H, d, J=1.0 Hz), 7.26-7.34 (5H, m). HRMS (ESI): Calcd for C$_{21}$H$_{23}$IN$_2$NaO$_9$ [MNa$^+$]597.0346, found 597.0351.

Compound 15: Under an argon stream, to an anhydrous dimethylformamide solution (50 mL) of compound 14 (4.2 g, 7.31 mmol) were added 18-crown -6 (7.7 g, 29.3 mmol) and potassium benzoate (4.7 g, 29.3 mmol), and the mixture was stirred at 80° C. for 36 hr. After completion of the reaction, the reaction mixture was diluted with water, and extracted twice with ethyl acetate. The organic layer was washed twice with water, once with saturated brine, and dried over sodium sulfate. The solvent was evaporated under reduced pressure to give a crude product (4 g). The crude product was purified by silica gel column chromatography (hexane/ethyl acetate=1:3) to give compound 15 (2.2 g, yield 53%) as a white foamy substance. 1H NMR (CDCl$_3$) δ: 1.91-1.96 (4H, m), 3.71-3.95 (4H, m), 4.52 and 4.69 (2H, AB, J=12.0 Hz), 4.65 (2H, s), 5.26 and 5.44 (2H, AB, J=10.0 Hz), 5.46 (1H, dd, J=7.0, 1.0 Hz), 5.64 (1H, d, J=1.0 Hz), 5.68 (1H, d, J=7.0 Hz), 6.99 (1H, d, J=1.0 Hz), 7.26-7.33 (5H, m), 7.45 (2H, t, J=7.5 Hz), 7.58 (1H, tt, J=7.5, 1.5 Hz), 8.08 (2H, dd, J=7.5, 1.5 Hz). HRMS (ESI): Calcd for C$_{28}$H$_{28}$N$_2$NaO$_{11}$ [MNa$^+$]591.1591, found 591.1594.

Compound 16: Under an argon stream, to an anhydrous tetrahydrofuran solution (35 mL) of compound 15 (2.2 g, 3.87 mmol) were added tributylamine (1.9 mL, 7.74 mmol) and 2-nitrophenyl selenocyanate (1.3 g, 5.81 mmol) at room temperature, and the mixture was stirred for 1 hr. After completion of the reaction, the reaction mixture was quenched by adding saturated aqueous sodium hydrogen carbonate and stirred at room temperature for 30 min. The mixture was extracted twice with ethyl acetate, washed once with saturated brine, and dried over sodium sulfate. The solvent was evaporated under reduced pressure to give a crude product (5.5 g). The crude product was purified by silica gel column chromatography (hexane/ethyl acetate=1:1 →1:2) to give compound 16 (2.2 g, yield 76%) as a yellow foamy substance. 1H NMR (CDCl$_3$) δ: 1.96 (3H, d, J=1.0 Hz), 3.06-3.25 (2H, m), 3.98-4.18 (2H, m), 4.41 and 4.75 (2H, AB, J=12.0 Hz), 4.65 (2H, s), 5.28 and 5.45 (2H, AB, J=10.0 Hz), 5.46 (1H, dd, J=7.5, 1.0 Hz), 5.66 (1H, d, J=7.5 Hz), 5.79 (1H, d, J=1.0 Hz), 7.04 (1H, d, J=1.0 Hz), 7.26-7.38 (6H, m), 7.44 (2H, t, J=7.5 Hz), 7.54-7.62 (3H, m), 8.05 (2H, dd, J=7.5, 1.5 Hz), 8.27 (1H, d, J=8.0 Hz). HRMS (ESI): Calcd for C$_{34}$H$_{31}$N$_3$NaO$_{12}$Se [MNa$^+$] 776.0971, found 776.0970.

Compound 17: To an anhydrous tetrahydrofuran solution (25 mL) of compound 16 (2.1 g, 2.79 mmol) were added 35% hydrogen peroxide water (0.72 mL, 8.37 mmol) and pyridine (0.68 mL, 8.37 mmol) at room temperature, and the mixture was stirred for 4 hr. After completion of the reaction, the reaction mixture was quenched by adding saturated aqueous sodium hydrogen carbonate, and the mixture was stirred at room temperature for 30 min. The mixture was extracted twice with ethyl acetate, washed once with saturated brine, and dried over sodium sulfate. The solvent was evaporated under reduced pressure to give a crude product (2 g). The crude product was purified by silica gel column chromatography (hexane/ethyl acetate=1:1) to give compound 17 (972 mg, yield 63%) as a yellow foamy substance. 1H NMR (CDCl$_3$) δ: 1.92 (3H, d, J=1.0 Hz), 4.46 (1H, dd, J=6.0, 1.5 Hz), 4.62 (2H, s), 4.64 (2H, s), 4.81 (1H, dd, J=14.0, 1.5 Hz), 5.19 and 5.42 (2H, AB, J=10.0 Hz), 5.48 (1H, dd, J=7.0, 1.5 Hz), 5.51 (1H, d, J=1.5 Hz), 5.70 (1H, d, J=7.0 Hz), 6.58 (1H, dd, J=14.0, 6.0 Hz), 6.97 (1H, d, J=1.0 Hz), 7.26-7.32 (5H, m), 7.44 (2H, t, J=7.5 Hz), 7.58 (1H, tt, J=7.5, 1.0 Hz), 8.08 (2H, dd, J=7.5, 1.0 Hz). HRMS (ESI): Calcd for C$_{28}$H$_{26}$N$_2$NaO$_{10}$ [MNa$^+$]573.1485, found 573.1487.

Compound 18: Under an argon stream, to an anhydrous methanol solution (15 mL) of compound 17 (972 mg, 1.77 mmol) was added potassium carbonate (48.8 mg, 0.35 mmol) at room temperature, and the mixture was stirred for 1 hr. After completion of the reaction, the reaction mixture was neutralized with acetic acid (20 μL, 0.35 mmol), and stirred at room temperature for 30 min. The solvent was evaporated under reduced pressure to give a crude product (1.1 g). The crude product was purified by silica gel column chromatography (chloroform/methanol=20:1) to give compound 18 (622 mg, yield 84%) as a white foamy substance. 1H NMR (CD$_3$OD) δ: 1.87 (3H, d, J=1.5 Hz), 3.65 and 3.76 (2H, AB, J=12.0 Hz), 4.18-4.24 (2H, m), 4.38 (1H, d, J=6.5 Hz), 4.56 (1H, dd, J=13.5, 1.0 Hz), 4.66 (2H, s), 5.49 (2H, s), 6.04 (1H, d, J=3.5 Hz), 6.71 (1H, dd, J=13.5, 6.0 Hz), 7.23-7.35 (5H, m), 7.66 (1H, d, J=1.5 Hz). HRMS (ESI): Calcd for C$_{20}$H$_{24}$N$_2$NaO$_8$ [MNa$^+$]443.1430, found 443.1431.

Compound 19: Under an argon stream, to an anhydrous pyridine solution (7 mL) of compound 18 (300 mg, 0.71 mmol) was added 1,3-dichloro-1,1,3,3-tetraisopropyldisiloxane (0.34 mL, 1.07 mmol) at 0° C., and the mixture was stirred at room temperature for 17 hr. After completion of the reaction, the reaction mixture was quenched by adding saturated aqueous sodium hydrogen carbonate. After stirring at room temperature for 30 min, the mixture was diluted with ethyl acetate. The organic layer was washed three times with water, once with saturated brine, and dried over sodium sulfate. The solvent was evaporated under reduced pressure to give a crude product (683 mg). The crude product was purified by silica gel column chromatography (hexane/ethyl acetate=3:1) to give compound 19 (270 mg, yield 57%) as a colorless oily substance. 1H NMR (CDCl$_3$) δ: 1.02-1.11

(28H, m), 1.91 (3H, d, J=1.0 Hz), 3.25 (1H, d, J=6.0 Hz), 3.91 and 4.06 (2H, AB, J=12.5 Hz), 4.25 (1H, td, J=6.5, 1.0 Hz), 4.30 (1H, dd, J=6.0, 1.0 Hz), 4.65 (1H, dd, J=13.5, 1.0 Hz), 4.71 (2H, s), 4.73 (1H, d, J=6.5 Hz), 5.46 and 5.50 (2H, AB, J=9.5 Hz), 5.75 (1H, d, J=1.0 Hz), 6.55 (1H, dd, J=13.5, 6.0 Hz), 7.10 (1H, d, J=1.0 Hz), 7.23-7.39 (5H, m). HRMS (ESI): Calcd for $C_{32}H_{50}N_2NaO_9Si_2$ [MNa$^+$]685.2953, found 685.2952.

Compound 20: Under an argon stream, to an anhydrous methylene chloride solution (4 mL) of compound 19 (285 mg, 0.43 mmol) was added 10-camphorsulfonic acid (5 mg, 0.021 mmol) at room temperature, and the mixture was stirred for 30 min. After completion of the reaction, the reaction mixture was neutralized with saturated aqueous sodium hydrogen carbonate. After stirring at room temperature for 30 min, the mixture was diluted with ethyl acetate. The organic layer was washed three times with water, once with saturated brine, and dried over sodium sulfate. The solvent was evaporated under reduced pressure to give a crude product (301 mg). The crude product was purified by silica gel column chromatography (hexane/ethyl acetate=5:1) to give compound 20 (229 mg, yield 80%) as a colorless oily substance. 1H NMR (CDCl$_3$) δ: 0.97-1.12 (28H, m), 1.42 (3H, d, J=4.5 Hz), 1.92 (3H, d, J=1.0 Hz), 3.82 and 4.02 (2H, AB, J=12.5 Hz), 3.90 (1H, d, J=3.0 Hz), 4.40 (1H, d, J=3.0 Hz), 4.72 (2H, s), 5.39 (1H, q, J=4.5 Hz), 5.47 and 5.52 (2H, AB, J=9.5 Hz), 6.09 (1H, s), 7.23-7.40 (5H, m), 7.56 (1H, d, J=1.0 Hz). HRMS (ESI): Calcd for $C_{32}H_{50}N_2NaO_9Si_2$ [MNa$^+$]685.2953, found 685.2949.

Compound 21: To a tetrahydrofuran solution (3 mL) of compound 20 (235 mg, 0.35 mmol) was added tetrabutylammonium fluoride (1 M tetrahydrofuran solution, 0.39 mL, 0.39 mmol) at room temperature, and the mixture was stirred for 1 hr. After completion of the reaction, the solvent was evaporated under reduced pressure to give a crude product (395 mg). The crude product was purified by silica gel column chromatography (chloroform/methanol=50:1) to give compound 21 (129 mg, yield 88%) as a colorless oily substance. 1H NMR (CD$_3$OD) δ: 1.40 (3H, d, J=5.0 Hz), 1.84 (3H, s), 3.66 and 3.73 (2H, AB, J=12.0 Hz), 3.79 (1H, d, J=3.0 Hz), 4.25 (1H, d, J=3.0 Hz), 4.67 (2H, s), 5.44-5.51 (3H, m), 6.12 (1H, s), 7.22-7.29 (5H, m), 7.93 (1H, s). HRMS (ESI): Calcd for $C_{20}H_{24}N_2NaO_8$ [MNa$^+$]443.1430, found 443.1429.

Compound 3: To an anhydrous methanol solution (3 mL) of compound 21 (109 mg, 0.26 mmol) was added palladium hydroxide-activated carbon (containing water (about 50%), 100 mg) at room temperature, and the mixture was stirred under a hydrogen stream for 12 hr. After completion of the reaction, the reaction mixture was suction filtered through Celite pad and evaporated under reduced pressure to give a crude product (85 mg). The crude product was purified by silica gel column chromatography (chloroform/methanol=20:1 →10:1) to give compound 3 (72 mg, yield 92%) as a colorless oily substance. 1H NMR (CD$_3$OD) δ: 1.40 (3H, d, J=5.0 Hz), 1.86 (3H, s), 3.67 and 3.74 (2H, AB, J=12.0 Hz), 3.91 (1H, d, J=3.0 Hz), 4.32 (1H, d, J=3.0 Hz), 5.47 (1H, q, J=5.0 Hz), 6.19 (1H, s), 8.02 (1H, s). HRMS (ESI): Calcd for $C_{12}H_{16}N_2NaO_7$ [MNa$^+$]323.0855, found 323.0854.

Synthesis of Adenine Base Analogue

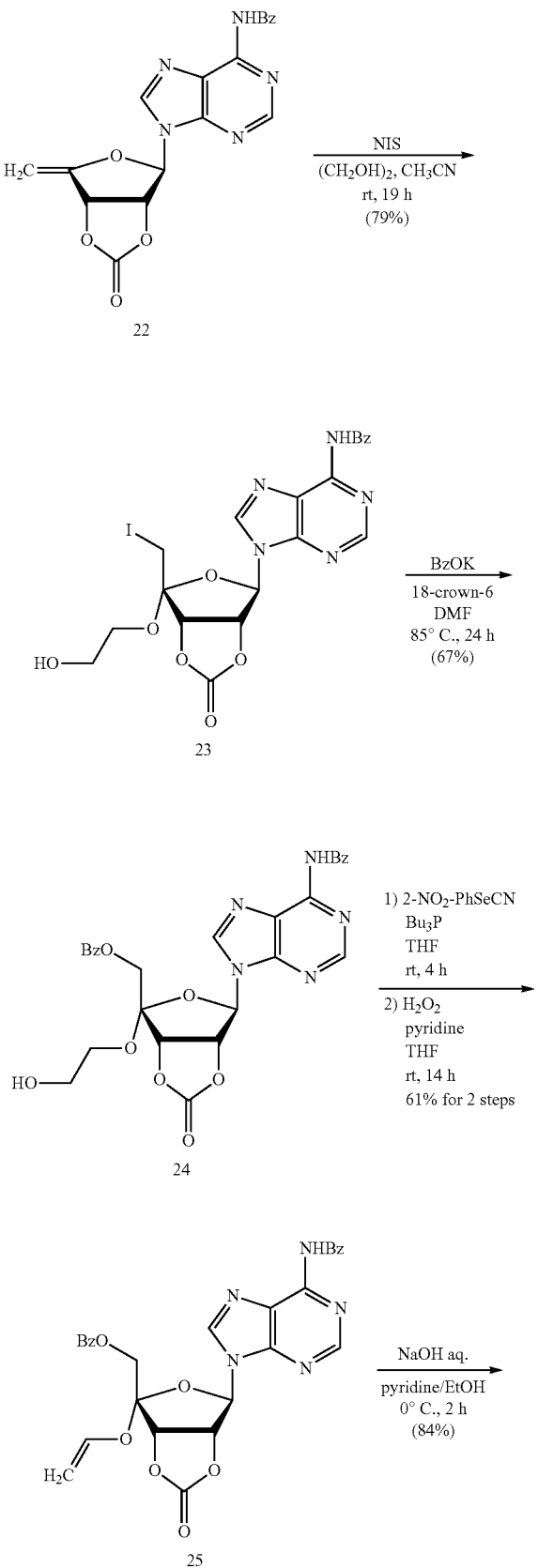

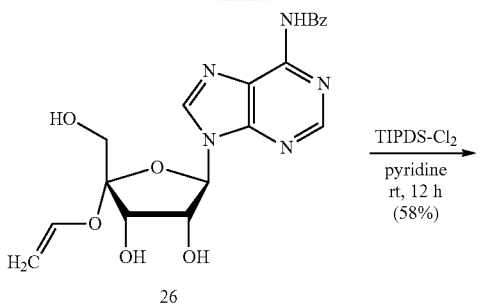

26

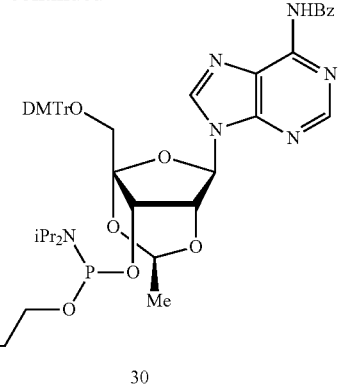

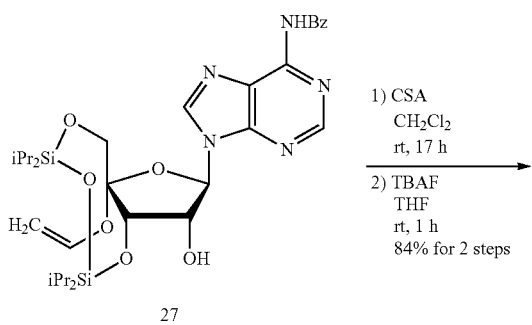

27

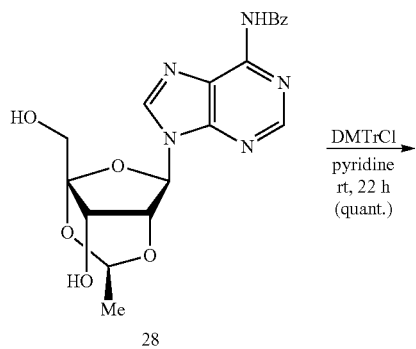

28

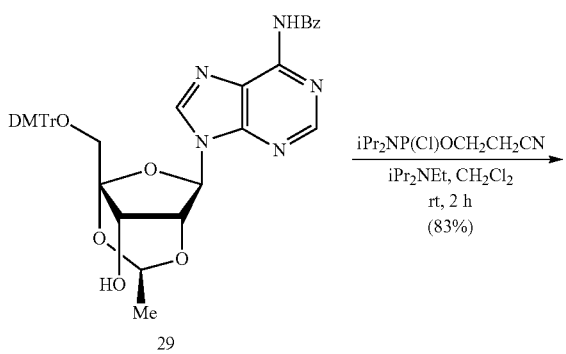

29

Compound 23: Under an argon stream, to an anhydrous acetonitrile solution (30 mL) of compound 22 (4.8 g, 12.7 mmol) synthesized according to a document (Carbohydr. Res. 1982, 100, 315-329) were added ethylene glycol (30 mL) and N-iodosuccinimide (4.0 g, 17.7 mmol) at 0° C., and the mixture was stirred at room temperature for 17 hr. After completion of the reaction, to the reaction mixture was added saturated sodium thiosulfate aqueous solution (200 mL), and the mixture was diluted with chloroform (200 mL). The organic layer was washed with saturated brine, dried over sodium sulfate, and the solvent was evaporated under reduced pressure. The crude product was purified by silica gel column chromatography (chloroform/methanol=40:1) to give compound 23 (5.7 g, yield 79%) as a pale-yellow solid. 1H NMR (CDCl$_3$) δ: 2.19 (1H, brs), 3.47 (1H, d, J=12.0 Hz), 3.69-3.71 (1H, m), 3.82-3.91 (3H, m), 5.65 (1H, d, J=7.5 Hz), 5.76 (1H, d, J=7.5 Hz), 6.46 (1H, s), 7.55 (2H, t, J=7.5 Hz), 7.64 (1H, t, J=7.5 Hz), 8.03 (2H, d, J=7.5 Hz), 8.15 (1H, s), 8.80 (1H, s), 8.99 (1H, brs). HRMS (ESI): Calcd for C$_{20}$H$_{18}$N$_5$O$_7$INa [M+Na$^+$]590.0149, found 590.0165.

Compound 24: Under an argon stream, to an N,N-dimethylformamide solution (3 mL) of compound 23 (100 mg, 0.176 mmol) were added potassium benzoate (118 mg, 0.733 mmol) 18-crown -6 (194 mg, 0.733 mmol) at room temperature, and the mixture was stirred at 85° C. for 24 hr. After completion of the reaction, to the reaction mixture was added saturated aqueous sodium hydrogen carbonate solution (50 mL) and the mixture was diluted with ethyl acetate (50 mL). The organic layer was washed with saturated brine, dried over sodium sulfate, and the solvent was evaporated under reduced pressure. The crude product was purified by silica gel column chromatography (chloroform/methanol=40:1) to give compound 24 (66 mg, yield 67%) as a white solid. $^1$H NMR (CDCl$_3$) δ: 2.25 (1H, brs), 3.80-3.82 (2H, m), 3.87-3.91 (1H, m), 4.01-4.03 (1H, m), 4.62 (1H, d, J=12.0 Hz), 5.82 (1H, dd, J=2.0, 7.5 Hz), 5.90 (1H, d, J=7.5 Hz), 6.54 (1H, d, J=2.0 Hz), 7.47 (2H, t, J=7.5 Hz), 7.54 (2H, t, J=7.5 Hz), 7.60-7.65 (2H, m), 8.02-8.05 (4H, m), 8.15 (1H, s), 8.63 (1H, s), 9.01 (1H, brs). HRMS (ESI): Calcd for C$_{27}$H$_{23}$N$_5$O$_9$Na [M+Na$^+$]584.1393, found 584.1399.

Compound 25: Compound 24 (484 mg, 0.86 mmol) was azeotropically distilled by dissolving in anhydrous tetrahydrofuran (10 mL). To the residue was added again anhydrous tetrahydrofuran (8 mL), tri-n-butylphosphine (0.424 mL, 348 mg, 1.72 mmol) and 2-nitrophenyl selenocyanate (292 mg, 1.29 mmol) were added under an argon stream at room temperature, and the mixture was stirred at room temperature for 4 hr. After completion of the reaction, the reaction mixture was quenched by adding saturated aqueous sodium hydrogen carbonate, and diluted with ethyl acetate. The organic layer was washed with saturated brine, dried over sodium sulfate, and the solvent was evaporated under reduced pressure. Ethyl acetate was added to the crude product and the resulting precipitate was collected by filtration and dried in vacuo to give a selenium intermediate (480 mg) as a yellow solid. The selenium intermediate (480 mg) was dissolved in anhydrous tetrahydrofuran (4 mL), 35% hydrogen peroxide water (0.19 mL, 1.93 mmol) and pyridine (0.16 mL, 1.93 mmol) were added, and the mixture was stirred at room temperature for 14 hr. After completion of the reaction, water (100 mL) and ethyl acetate (100 mL) were added to the reaction mixture and partitioning and extraction were performed. The organic layer was washed with saturated brine, dried over sodium sulfate, and the solvent was evaporated under reduced pressure. The crude product was purified by silica gel column chromatography (hexane/ethyl acetate=1:2) to give compound 25 (286 mg, yield 61%) as a white solid. $^1$H NMR (CDCl$_3$) δ: 4.54 (1H, dd, J=2.0, 6.0 Hz), 4.63 (1H, d, J=12.0 Hz), 5.94 (1H, d, J=8.0 Hz), 6.34 (1H, d, J=2.0 Hz), 6.65 (1H, dd, J=6.0, 12.0 Hz), 7.45-7.64 (6H, m), 8.01-8.04 (4H, m), 8.14 (1H, s), 8.56 (1H, s), 8.97 (1H, brs). HRMS (ESI): Calcd for C$_{27}$H$_{21}$N$_5$O$_8$Na [M+Na$^+$]566.1288, found 566.1329.

Compound 26: Under an argon stream, to a solution of compound 25 (370 mg, 0.68 mmol) in ethanol/pyridine (1:1, 4 mL) was added 1 M sodium hydroxide aqueous solution (3.4 mL, 3.4 mmol) at 0° C., and the mixture was stirred at 0° C. for 2 hr. After completion of the reaction, the reaction mixture was neutralized with DOWEX and filtered, and the filtrate was evaporated under reduced pressure. The crude product was purified by silica gel column chromatography (chloroform/methanol=30:1) to give compound 26 (237 mg, yield 84%) as a white solid. 1H NMR (CD$_3$OD) δ: 3.71 (1H, d, J=12.0 Hz), 3.81 (1H, d, J=12.0 Hz), 4.21 (1H, d, J=6.0 Hz), 4.60 (1H, d, J=14.0 Hz), 4.68 (1H, d, J=6.0 Hz), 4.81-4.83 (1H, m), 6.32 (1H, d, J=5.0 Hz), 6.62 (1H, dd, J=6.0, 13.5 Hz), 7.57 (2H, t, J=7.5 Hz), 7.66 (1H, t, J=7.5 Hz), 8.09 (2H, d, J=7.5 Hz), 8.64 (1H, s), 8.73 (1H, s).HRMS (ESI): Calcd for C$_{19}$H$_{19}$N$_5$O$_7$Na [M+Na$^+$] 436.1233, found 436.1233.

Compound 27: Compound 26 (237 mg, 0.57 mmol) was azeotropically distilled by dissolving in anhydrous pyridine (5 mL). To the residue was added again anhydrous pyridine (5 mL), 1,3-dichloro-1,1,3,3-tetraisopropyldisiloxane (0.37 mL, 1.15 mmol) was added under an argon stream at 0° C., and the mixture was stirred at room temperature for 12 hr. After completion of the reaction, to the reaction mixture was added saturated aqueous sodium hydrogen carbonate solution (50 mL) and the mixture was diluted with ethyl acetate (50 mL). The organic layer was washed with saturated brine, dried over sodium sulfate, and the solvent was evaporated under reduced pressure. The crude product was purified by silica gel column chromatography (hexane/ethyl acetate=2:1) to give compound 27 (219 mg, yield 58%) as a white solid. 1H NMR (CDCl$_3$) δ: 1.07-1.17 (28H, m), 3.45 (1H, d, J=5.5 Hz), 3.98 (1H, d, J=12.5 Hz), 4.06 (1H, d, J=12.5 Hz), 4.34 (1H, d, J=6.0 Hz), 4.69-4.74 (2H, m), 5.50 (1H, d, J=6.0 Hz), 6.13 (1H, s), 6.62 (1H, dd, J=6.0, 13.5 Hz), 7.53 (2H, t, J=7.5 Hz), 7.62 (1H, t, J=7.5 Hz), 8.02 (2H, d, J=7.5 Hz), 8.08 (1H, s), 8.73 (1H, s), 8.98 (1H, s).HRMS (ESI): Calcd for C$_{31}$H$_{45}$N$_5$O$_7$NaSi$_2$ [M+Na$^+$]678.2755, found 678.2755.

Compound 28: Under an argon stream, to a solution of compound 27 (219 mg, 0.33 mmol) in anhydrous dichloromethane (4 mL) was added 10-camphorsulfonic acid (8 mg, 0.03 mmol) at 0° C., and the mixture was stirred at room temperature for 17 hr. After completion of the reaction, to the reaction mixture was added saturated aqueous sodium hydrogen carbonate solution (50 mL), and the mixture was diluted with ethyl acetate (50 mL). The organic layer was washed with saturated brine, dried over sodium sulfate, and the solvent was evaporated under reduced pressure to give an acetal intermediate (216 mg) as a white solid. 1H NMR (CDCl$_3$) δ: 0.95-1.11 (28H, m), 1.48 (3H, d, J=5.0 Hz), 3.87 (1H, d, J=12.6 Hz), 4.04 (1H, d, J=12.6 Hz), 4.32 (1H, d, J=3.0 Hz), 4.86 (1H, d, J=3.0 Hz), 5.51 (1H, q, J=5.0 Hz), 6.60 (1H, s), 7.54 (2H, t, J=7.5 Hz), 7.62 (1H, t, J=7.5 Hz), 8.02 (2H, d, J=7.5 Hz), 8.35 (1H, s), 8.82 (1H, s), 9.01 (1H, s).HRMS (ESI): Calcd for C$_{31}$H$_{45}$N$_5$O$_7$NaSi$_2$ [M+Na$^+$] 678.2755, found 678.2759. Under an argon stream, acetal intermediate (216 mg) was dissolved in anhydrous tetrahydrofuran (3 mL), tetrabutylammonium fluoride (1 M tetrahydrofuran solution, 0.66 mL, 0.66 mmol) was added at room temperature, and the mixture was stirred for 1 hr. After completion of the reaction, the solvent was evaporated under reduced pressure, and the crude product was subjected to silica gel column chromatography (chloroform/methanol=30:1) to give compound 28 (115 mg, yield 84%) as a white solid. 1H NMR (DMSO-d 6) δ: 1.38 (3H, d, J=5.0 Hz), 3.57 (1H, d, J=6.0 Hz), 4.10 (1H, dd, J=3.0, 8.0 Hz), 4.65 (1H, d, J=3.0 Hz), 5.20 (1H, d, J=8.0 Hz), 5.47 (1H, d, J=7.9 Hz), 5.53 (1H, q, J=5.0 Hz), 6.78 (1H, s), 7.55 (2H, t, J=7.5 Hz), 7.65 (1H, t, J=7.5 Hz), 8.04 (2H, d, J=7.5 Hz), 8.59 (1H, s), 8.77 (1H, s), 11.2 (1H, s).HRMS (ESI): Calcd for C$_{19}$H$_{19}$N$_5$O$_6$Na [M+Na$^+$]436.1233, found 436.1232.

Compound 29: Compound 28 (115 mg, 0.28 mmol) was azeotropically distilled by dissolving in anhydrous pyridine (5 mL). To the residue was added again anhydrous pyridine (3 mL), 4,4'-dimethoxytrityl chloride (189 mg, 0.56 mmol) was added under an argon stream at room temperature, and the mixture was stirred at room temperature for 22 hr. After completion of the reaction, the reaction mixture was quenched by adding saturated aqueous sodium hydrogen carbonate and diluted with ethyl acetate. The organic layer was washed twice with saturated aqueous sodium hydrogen carbonate, once with saturated brine, dried over sodium sulfate, and the solvent was evaporated under reduced pressure. The crude product was purified by silica gel column chromatography (hexane/ethyl acetate=1:2) to quantitatively give compound 29 (199 mg) as a white solid. 1H NMR (CDCl$_3$) δ: 1.44 (3H, d, J=5.0 Hz), 2.61 (1H, d, J=12 Hz), 3.40 (1H, d, J=10 Hz), 3.46 (1H, d, J=10 Hz), 3.79 (6H, s), 4.54 (1H, dd, J=3.0, 12 Hz), 4.77 (1H, d, J=3.0 Hz), 5.51 (1H, q, J=5.0 Hz), 6.68 (1H, s), 6.85 (4H, d, J=8.9 Hz), 7.23-7.26 (1H, m), 7.29-7.33 (6H, m), 7.42 (2H, d, J=7.5 Hz), 7.54 (2H, t, J=7.5 Hz), 7.62 (1H, t, J=7.5 Hz), 8.04 (2H, d, J=7.5 Hz), 8.52 (1H, s), 8.84 (1H, s), 9.20 (1H, s).HRMS (ESI): Calcd for C$_{40}$H$_{37}$N$_5$O$_8$Na [M+Na$^+$]738.2540, found 738.2537.

Compound 30: Under an argon stream, to an anhydrous dichloromethane solution (2 mL) of compound 29 (150 mg, 0.21 mmol) was added N,N-diisopropyl ethylamine (0.22 mL, 1.26 mmol), 2-cyanoethyl N,N-diisopropylchlorophosphoramidite (0.14 mL, 0.63 mmol) was added dropwise at 0° C., and the mixture was stirred at room temperature for 2 hr. After completion of the reaction, the reaction mixture was quenched by adding saturated aqueous sodium hydrogen carbonate, and diluted with ethyl acetate. The organic layer was washed once with saturated brine, dried over sodium sulfate, and the solvent was evaporated under reduced pressure. The crude product was purified by silica gel column chromatography (hexane/ethyl acetate=1:1) to give compound 30 (160 mg, yield 83%) as a white solid. 1H NMR (CDCl$_3$) δ: 1.00-1.18 (12H, m), 1.39 (3H, brs), 2.33-2.37 (1H, m), 2.47-2.49 (1H, m), 3.32-3.39 (1H, m), 3.52-3.73 (4H, m), 3.78-3.79 (6H, m), 4.56 (0.5H, d, J=6.7 Hz), 4.63 (0.5H, d, J=8.5 Hz), 4.96 (0.5H, brs), 4.98 (0.5H, brs), 5.51-5.53 (1H, m), 6.68 (0.5H, s), 6.69 (0.5H, s), 6.81-6.84 (4H, m), 7.21-7.29 (7H, m), 7.38-7.41 (2H, m), 7.52-7.55 (2H, m), 7.60-7.63 (1H, m), 8.02 (2H, d, J=7.5 Hz), 8.51 (0.5H, s), 8.53 (0.5H, s), 8.84 (1H, brs), 8.99-9.00 (1H, brd). $^{31}$P NMR (CDCl$_3$) δ: 149.6, 149.7. HRMS (ESI): Calcd for $C_{49}H_{55}N_7O_9P$ [M+H$^+$]916.3799, found 916.3797.
Synthesis of Guanine Base Analogue
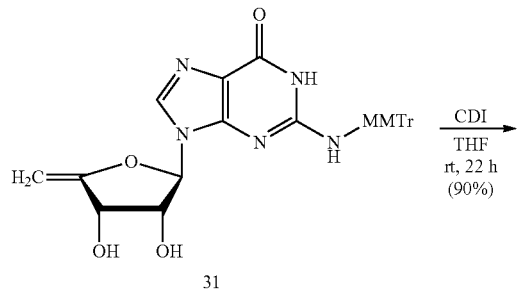
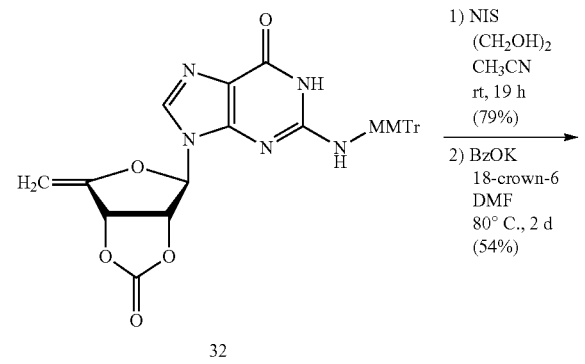
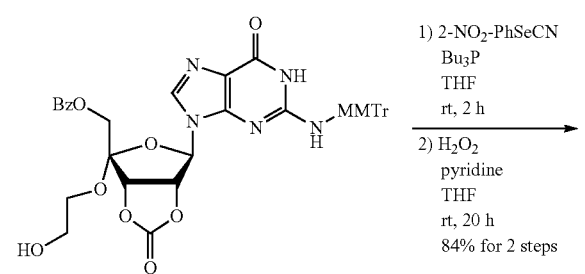
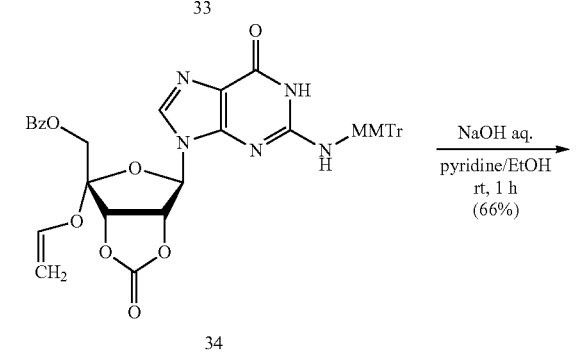
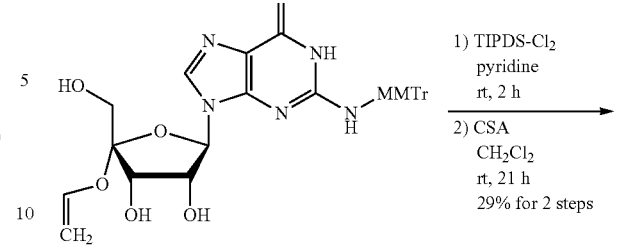
Compound 32: Under an argon stream, to an anhydrous tetrahydrofuran solution (3 mL) of compound 31 (100 mg, 0.19 mmol) synthesized according to WO patent (WO 2016/115222 A1) was added N,N-carbonyldiimidazole (45 mg, 0.28 mmol), and the mixture was stirred at room temperature for 22 hr. After completion of the reaction, the reaction mixture was evaporated under reduced pressure, and the crude product was purified by silica gel column chromatography (chloroform/methanol=30:1) to give compound 32 (95 mg, yield 90%) as a white solid. 1H NMR (CDCl$_3$) δ: 3.73 (3H, s), 4.19 (1H, d, J=3.0 Hz), 4.47 (2H, dd, J=7.0, 12.0 Hz), 4.68 (1H, d, J=2.0 Hz), 6.39 (1H, s), 6.91 (2H, d, J=9.0 Hz), 7.12 (2H, d, J=9.0 Hz), 7.22 (4H, t, J=7.0 Hz), 7.29-7.37 (6H, m), 7.73 (1H, s), 7.77 (1H, s), 10.88 (1H, brs). HRMS (ESI): Calcd for $C_{31}H_{25}N_5O_6Na$ [M+Na$^+$]586.1703, found 586.1703.

Compound 33: Under an argon stream, to an anhydrous tetrahydrofuran solution (10 mL) of compound 32 (2.0 g, 3.55 mmol) were added ethylene glycol (10 mL) and N-iodosuccinimide (1.1 g, 4.97 mmol) at room temperature, and the mixture was stirred at 45° C. for 16 hr. After completion of the reaction, to the reaction mixture was added saturated sodium thiosulfate aqueous solution (200 mL), and the mixture was diluted with chloroform (200 mL). The organic layer was washed with saturated brine, dried over sodium sulfate, and the solvent was evaporated under reduced pressure. The crude product was purified by silica gel column chromatography (chloroform/methanol=30:1) to give iodine intermediate (2.1 g, yield 79%, diastereomer mixing ratio about 4:1) as a pale-yellow solid. HRMS (ESI): Calcd for $C_{33}H_{29}N_5O_8I$ [M–H$^{-]750.1061}$, found 750.1061. Under an argon stream, the aforementioned iodine intermediate (810 mg, 1.08 mmol) was dissolved in N,N-dimethylformamide (5 mL), potassium benzoate (865 mg, 5.39 mmol) and 18-crown -6 (1.43 g, 5.39 mmol) were added at room temperature, and the mixture was stirred at 80° C. for 2 days. After completion of the reaction, to the reaction mixture was added saturated aqueous sodium hydrogen carbonate solution (100 mL) and the mixture was diluted with ethyl acetate (100 mL). The organic layer was washed with saturated brine, dried over sodium sulfate, and the solvent was evaporated under reduced pressure. The crude product was purified by silica gel column chromatography (chloroform/methanol=40:1) to give compound 33 (433 mg, yield 54%) as a white solid. 1H NMR (CD$_3$OD) δ: 3.59-3.64 (6H, m), 3.74-3.82 (3H, m), 4.23 (1H, d, J=7.5 Hz), 4.42 (1H, dd, J=2.0, 7.5 Hz), 6.20 (1H, d, J=2.0 Hz), 6.84 (2H, d, J=9.0 Hz), 7.15-7.21 (4H, m), 7.25-7.32 (8H, m), 7.53 (2H, t, J=7.5 Hz), 7.66 (1H, t, J=7.5 Hz), 7.76 (1H, s), 7.98 (2H, d, J=7.5 Hz). HRMS (ESI): Calcd for $C_{40}H_{35}N_{10}Na$ [M+Na$^+$]768.2282, found 768.2276.

Compound 34: Compound 33 (1.44 g, 1.93 mmol) was azeotropically distilled by dissolving in anhydrous tetrahydrofuran (10 mL). To the residue was added again anhydrous tetrahydrofuran (10 mL), tri-n-butylphosphine (0.952 mL, 781 mg, 3.86 mmol) and 2-nitrophenyl selenocyanate (658 mg, 2.90 mmol) were added under an argon stream at room temperature, and the mixture was stirred at room temperature for 2 hr. After completion of the reaction, the reaction mixture was quenched by adding saturated aqueous sodium hydrogen carbonate and diluted with ethyl acetate. The organic layer was washed once with saturated brine, dried over sodium sulfate, and the solvent was evaporated under reduced pressure. The crude product was purified by silica gel column chromatography (chloroform/methanol=40:1) to give a selenium intermediate (2.05 g) as a yellow solid. The selenium intermediate (2.05 g) was dissolved in anhydrous tetrahydrofuran (20 mL), 35% hydrogen peroxide water (0.58 mL, 5.79 mmol) and sodium hydrogen carbonate (486 mg, 5.79 mmol) were added, and the mixture was stirred at room temperature for 20 hr. After completion of the reaction, water (100 mL) and ethyl acetate (200 mL) were added to the reaction mixture and partitioning and extraction were performed. The organic layer was washed with saturated brine, dried over sodium sulfate, and the solvent was evaporated under reduced pressure. The crude product was purified by silica gel column chromatography (chloroform/methanol=40:1) to give compound 34 (1.18 g, yield 84%) as a white solid. 1H NMR (CDCl$_3$) δ: 3.66 (3H, s), 3.86 (1H, d, J=12.0 Hz), 4.17 (1H, d, J=7.5 Hz), 4.38-4.42 (2H, m), 4.67-4.72 (2H, m), 5.70 (1H, d, J=2.0 Hz), 6.47 (1H, dd, J=6.0, 13.5 Hz), 6.75 (2H, d, J=9.0 Hz), 7.10-7.26 (12H, m), 7.49 (2H, t, J=8.0 Hz), 7.61 (1H, t, J=8.0 Hz), 7.97-8.03 (3H, m), 11.73 (1H, brs). HRMS (ESI): Calcd for $C_{40}H_{33}N_5O_9Na$ [M+Na$^+$]750.2176, found 750.2177.

Compound 35: Under an argon stream, to a solution of compound 34 (240 mg, 0.33 mmol) in ethanol/pyridine (1:1, 4 mL) was added 2 M sodium hydroxide aqueous solution (0.82 mL, 1.65 mmol) at 0° C., and the mixture was stirred at room temperature for 1 hr. After completion of the reaction, the reaction mixture was neutralized with DOWEX and filtered, and the filtrate was evaporated under reduced pressure. The crude product was purified by silica gel column chromatography (chloroform/methanol=20:1) to give compound 35 (131 mg, yield 66%) as a white solid. 1H NMR (CD$_3$OD) δ: 3.43 (1H, d, J=12.0 Hz), 3.48 (1H, d, J=12.0 Hz), 3.77 (3H, s), 4.10-4.11 (3H, m), 4.51 (1H, d, J=14.0 Hz), 5.45 (1H, t, J=2.0 Hz), 6.53 (1H, dd, J=6.0, 14.0 Hz), 6.85 (2H, d, J=9.0 Hz), 7.22-7.24 (4H, m), 7.28-7.33 (8H, m), 7.82 (1H, s).HRMS (ESI): Calcd for $C_{32}H_{31}N_5O_7Na$ [M+Na$^+$]620.2121, found 620.2124.

Compound 36: Compound 35 (389 mg, 0.65 mmol) was azeotropically distilled by dissolving in anhydrous acetonitrile (10 mL). To the residue was added anhydrous N,N-dimethylformamide (5 mL), imidazole (177 mg, 2.60 mmol) and 1,3-dichloro-1,1,3,3-tetraisopropyldisiloxane (0.42 mL, 1.30 mmol) were added under an argon stream at room temperature, and the mixture was stirred at room temperature for 2 hr. After completion of the reaction, to the reaction mixture was added saturated aqueous sodium hydrogen carbonate solution (100 mL) and the mixture was diluted with ethyl acetate (100 mL). The organic layer was washed with saturated brine, dried over sodium sulfate, and the solvent was evaporated under reduced pressure. The crude product was purified by silica gel column chromatography (chloroform/methanol=50:1) to give a disiloxane intermediate (614 mg) as a white solid. Under an argon stream, to a solution of the disiloxane intermediate (614 mg) in anhydrous dichloromethane (5 mL) was added 10-camphorsulfonic acid (151 mg, 0.65 mmol) at room temperature, and the mixture was stirred at room temperature for 15 hr. After 15 hr, 10-camphorsulfonic acid (75 mg, 0.32 mmol) was further added, and the mixture was stirred at room temperature for 1 hr. After completion of the reaction, to the reaction mixture was added saturated aqueous sodium hydrogen carbonate solution (50 mL) and the mixture was diluted with chloroform (50 mL). The organic layer was washed with saturated brine, dried over sodium sulfate, and the solvent was evaporated under reduced pressure. The crude product was purified by silica gel column chromatography (chloroform/ methanol=20:1) to give compound 36 (106 mg, yield 29%) as a white solid. 1H NMR (CDCl$_3$) δ: 0.95-1.12 (28H, m), 1.45 (3H, d, J=5.0 Hz), 3.85 (1H, d, J=12.5 Hz), 4.04 (1H, d, J=12.5 Hz), 4.21 (1H, d, J=3.0 Hz), 4.58 (1H, d, J=3.0 Hz), 5.47 (1H, q, J=5.0 Hz), 6.29 (1H, s), 6.57 (2H, brs), 7.84 (1H, s), 11.94 (1H, brs). HRMS (ESI): Calcd for C$_{24}$H$_{41}$N$_5$O$_7$NaSi$_2$ [M+Na$^+$]590.2442, found 590.2446.

Compound 37: Compound 36 (22 mg, 0.039 mmol) was azeotropically distilled by dissolving in anhydrous pyridine (1 mL). To the residue was added again anhydrous pyridine (1 mL), isobutyryl chloride (8.2 μL, 0.078 mmol) was added under an argon stream at 0° C., and the mixture was stirred for 2 hr. After completion of the reaction, to the reaction mixture was added saturated aqueous sodium hydrogen carbonate solution (20 mL) and the mixture was diluted with chloroform (20 mL). The organic layer was washed with saturated brine, dried over sodium sulfate, and the solvent was evaporated under reduced pressure to give an intermediate (25 mg). Under an argon stream, the intermediate (25 mg) was dissolved in anhydrous tetrahydrofuran (1 mL), tetrabutylammonium fluoride (1 M tetrahydrofuran solution, 0.1 mL, 0.1 mmol) was added at room temperature, and the mixture was stirred for 1 hr. After completion of the reaction, the solvent was evaporated under reduced pressure, and the crude product was subjected to silica gel column chromatography (chloroform/methanol=15:1) to give compound 37 (11 mg, yield 69%) as a white solid. 1H NMR (CD$_3$OD) δ: 1.22 (6H, d, J=7.0 Hz), 1.42 (3H, d, J=5.0 Hz), 2.66-2.74 (1H, m), 3.69 (1H, d, J=12.0 Hz), 3.74 (1H, d, J=12.0 Hz), 4.16 (1H, d, J=3.0 Hz), 4.60 (1H, d, J=3.0 Hz), 5.53 (1H, q, J=5.0 Hz), 6.54 (1H, s), 8.25 (1H, s). HRMS (ESI): Calcd for C$_{16}$H$_{21}$N$_5$O$_7$Na [M+Na$^+$]418.1339, found 418.1339.

Compound 38: Compound 37 (155 mg, 0.18 mmol) was azeotropically distilled by dissolving in anhydrous pyridine (2 mL). To the residue was added again anhydrous pyridine (2 mL), 4,4'-dimethoxytrityl chloride (89 mg, 0.26 mmol) was added under an argon stream at room temperature, and the mixture was stirred at room temperature for 16 hr. After completion of the reaction, the reaction mixture was quenched by adding saturated aqueous sodium hydrogen carbonate, and diluted with chloroform. The organic layer was washed twice with saturated aqueous sodium hydrogen carbonate, once with saturated brine, dried over sodium sulfate, and the solvent was evaporated under reduced pressure. The crude product was purified by silica gel column chromatography (chloroform/methanol=50:1) to give compound 38 (82 mg, yield 67%) as a white solid. 1H NMR (CDCl$_3$) δ: 1.26 (6H, d, J=7.0 Hz), 1.39 (3H, d, J=5.0 Hz), 2.55-2.62 (1H, m), 3.36 (1H, d, J=10.0 Hz), 3.41 (1H, d, J=10 Hz), 3.79 (6H, s), 4.51 (1H, dd, J=3.0, 12 Hz), 4.59 (1H, d, J=3.0 Hz), 5.43 (1H, q, J=5.0 Hz), 6.35 (1H, s), 6.83 (4H, d, J=9.0 Hz), 7.20-7.23 (1H, m), 7.28-7.31 (6H, m), 7.39-7.40 (2H, m), 8.11 (1H, s), 8.25 (1H, s). HRMS (ESI): Calcd for C$_{37}$H$_{39}$N$_5$O$_9$Na [M+Na$^+$]720.2645, found 720.2642.

Compound 39: Under an argon stream, to an anhydrous dichloromethane solution (1 mL) of compound 38 (35 mg, 0.05 mmol) was added N,N-diisopropyl ethylamine (52 μL, 0.3 mmol), 2-cyanoethyl N,N-diisopropylchlorophosphoramidite (33 μL, 0.15 mmol) was added dropwise at 0° C., and the mixture was stirred at room temperature for 2 hr. After completion of the reaction, the reaction mixture was quenched by adding saturated aqueous sodium hydrogen carbonate, and diluted with ethyl acetate. The organic layer was washed once with saturated brine, dried over sodium sulfate, and the solvent was evaporated under reduced pressure. The crude product was purified by silica gel column chromatography (hexane/ethyl acetate=1:2) to give compound 39 (24 mg, yield 53%) as a white solid. 1H NMR (CDCl$_3$) δ: 1.03 (3H, d, J=7.0 Hz), 1.07 (3H, d, J=7.0 Hz), 1.13-1.16 (6H, m), 1.26-1.28 (6H, m), 1.38 (3H, t, J=6.0 Hz), 2.40-2.60 (3H, m), 3.30 (1H, d, J=11.0 Hz), 3.35 (1H, d, J=11.0 Hz), 3.47-3.65 (3H, m), 3.70-3.79 (8H, m), 4.42 (0.5H, dd, J=3.0, 6.0 Hz), 4.56 (0.5H, dd, J=3.0, 6.0 Hz), 4.95 (0.5H, d, J=3.0 Hz), 5.01 (0.5H, d, J=3.0 Hz), 5.44-5.48 (1H, m), 6.36 (0.5H, s), 6.37 (0.5H, s), 6.81-6.83 (4H, m), 7.20-7.24 (1H, m), 7.26-7.30 (6H, m), 7.38-7.40 (2H, m), 8.12 (0.5H, s), 8.15 (0.5H, s), 8.25 (1H, s), 8.36 (1H, s), 11.94 (1H, brs), 11.97 (1H, brs). $^{31}$P NMR (CDCl$_3$) δ: 146.8, 148.5. HRMS (ESI): Calcd for C$_{46}$H$_{57}$N$_7$O$_{10}$P [M+H$^+$] 898.3905, found 898.3893.

Synthesis of TaNA Analogue-Introduced Oligonucleotide

Oligonucleotide was synthesized by preparing amidite block 5 and commercially available phosphoramidites of dA(Bz), dG(iBu), dC(Bz), d$^m$C(Ac), and T as 0.1 M anhydrous acetonitrile solutions and using GeneDesign nS-811 Oligonucleotides Synthesizer and according to the general phosphoramidite method. The synthesis scale was 0.2 μmol, trityl on conditions was adopted. 5-Ethylthio-1H-tetrazole (0.25 M anhydrous acetonitrile solution) was used as the activator and the condensation time was 5 minutes for amidite block 5 and 25 seconds for natural amidite block. After completion of synthesis, oligonucleotide was treated with 28% aqueous ammonia at room temperature for 1.5 hr, after which cutting from the column carrier and deprotection of the base part and phosphate diester part were performed. Then, the oligonucleotide was purified with a simple gel filtration column (Waters Sep-Pak (registered trade mark) Plus C18 Cartridges) and further purified by reverse-phase HPLC. The HPLC measurement conditions are shown below.

eluent SOLUTION A: 0.1 M acetic acid triethylammonium buffer (pH 7.0)
SOLUTION B: acetonitrile
gradient SOLUTION B concentration: 5-15% (30 min) or 10-15% (30 min)
(separation of oligonucleotide for enzyme resistance)
column Waters XBridge (registered trade mark) Shield RP18 5 μm (10×50 mm) (purification)
Waters XBridge (registered trade mark) Shield RP18 2.5 μm (4.6×50 mm) (purity confirmation)
flow rate 2.0 mL/min (purification)
1.0 mL/min (purity confirmation)
column temperature 40° C.
detection UV (260 nm)

Melting Temperature (T$_m$) Measurement (Double Strand-Forming Ability Evaluation)

A sample solution (120 L) with final concentrations of 10 mM phosphate buffer (pH7.0), 200 mM sodium chloride, and 2.5 μM each oligonucleotide was immersed in boiling water and slowly cooled to room temperature. The sample solution was cooled to 20° C., and the measurement was started. The temperature was raised to 90° C. at a rate of 0.5° C. per minute, and the absorbance at 260 nm was plotted at intervals of 0.5° C. All T$_m$ values were calculated by the midline method and the average of three independent measurement results was taken.

TABLE 1

$T_m$ measurement with single-stranded nucleic acid

| Oligonucleotides | single-stranded RNA: 5'-r(ACGAGAACAUCC)-3' (SEQ ID NO: 11) | | single-stranded DNA: 5'-d(ACGAGAACATCC)-3' (SEQ ID NO: 12) | |
|---|---|---|---|---|
| | $T_m$ (° C.) | $\Delta T_m$/mod. (° C.) | $T_m$ (° C.) | $\Delta T_m$/mod. (° C.) |
| 5'-GGATGTTCTCGT-3' (SEQ ID NO: 1) | 52 | — | 51 | — |
| 5'-GGATGXTCTCGT-3' (SEQ ID NO: 2) | 58 | +6.0 | 53 | +2.0 |
| 5'-GGATGYTCTCGT-3' (SEQ ID NO: 3) | 58 | +6.0 | 54 | +3.0 |
| 5'-GGATGZTCTCGT-3' (SEQ ID NO: 4) | 58 | +6.0 | 52 | +1.0 |
| 5'-GGATGXXCTCGT-3' (SEQ ID NO: 5) | 66 | +7.0 | 58 | +3.5 |
| 5'-GGATGYYCTCGT-3' (SEQ ID NO: 6) | 64 | +6.0 | 57 | +3.0 |
| 5'-GGATGZZCTCGT-3' (SEQ ID NO: 7) | 64 | +6.0 | 57 | +3.0 |
| 5'-GGAXGXTCTCGT-3' (SEQ ID NO: 8) | 66 | +7.0 | 58 | +3.5 |
| 5'-GGAYGYTCTCGT-3' (SEQ ID NO: 9) | 65 | +6.5 | 58 | +3.5 |
| 5'-GGAZGZTCTCGT-3' (SEQ ID NO: 10) | 65 | +6.5 | 57 | +3.0 |

TABLE 2

$T_m$ measurement with single-stranded RNA (base sequence identifying ability)

| Oligonucleotides | single-stranded RNA: 5'-r(ACGAGANCAUCC)-3' (SEQ ID NO: 11) | | | |
|---|---|---|---|---|
| | $T_m$ (° C.) (N = A) | $T_m$ (° C.) (N = G) | $T_m$ (° C.) (N = C) | $T_m$ (° C.) (N = U) |
| 5'-GGATGTTCTCGT-3' (SEQ ID NO: 1) | 52 | 48 (−4) | 38 (−14) | 40 (−12) |
| 5'-GGATGXTCTCGT-3' (SEQ ID NO: 2) | 58 | 53 (−5) | 43 (−15) | 44 (−14) |
| 5'-GGATGYTCTCGT-3' (SEQ ID NO: 3) | 58 | 53 (−5) | 44 (−14) | 45 (−13) |
| 5'-GGATGZTCTCGT-3' (SEQ ID NO: 4) | 58 | 54 (−4) | 43 (−15) | 45 (−13) |

Conditions: 10 mM sodium phosphate buffer containing 200 mM NaCl and 2.5M of each strand. $\Delta T_m$ (° C.) is shown in parentheses.

conditions: 10 mM sodium phosphate buffer (pH7.0) containing 200 mM NaCl, 2.5 M of each strand In Table, X, Y, and Z mean the following modifications. The sequences of oligonucleotide and modified oligonucleotide are shown in SEQ ID NOs: 1 to 10, and the sequences of single-stranded RNA and single-stranded DNA are respectively shown in SEQ ID NOs: 11 and 12.

Melting Temperature ($T_m$) Measurement (Triple Strand-Forming Ability Evaluation)

A sample solution (120 L) with final concentrations of 10 mM phosphate buffer (pH7.0), 200 mM potassium chloride, 10 mM magnesium chloride, 4 µM each oligonucleotide was immersed in boiling water and slowly cooled to room temperature. The sample solution was cooled to 15° C., and the measurement was started. The temperature was raised to 90° C. at a rate of 0.5° C. per minute, and the absorbance at 260 nm was plotted at intervals of 0.5° C. All $T_m$ values were calculated by the midline method and the average of three independent measurement results was taken.

TABLE 3

$T_m$ measurement with double-stranded hairpin DNA double-stranded hairpin DNA : 5'-d(GGCAGAAGAAAAAGAGACGC)-C18 spacer-d(GCGTCTCTTTTTCTTCTGCC)-3' (SEQ ID NO: 23)

| Oligonucleotides | $T_m$ (° C.) | $\Delta T_m$/mod. (° C.) |
|---|---|---|
| 5'-TCTTCTTTTTCTCT-3' (SEQ ID NO: 13) | 31 | — |
| 5'-TCTTCTTXTTCTCT-3' (SEQ ID NO: 14) | 36 | +5.0 |
| 5'-TCTTCTTYTTCTCT-3' (SEQ ID NO: 15) | 37 | +6.0 |
| 5'-TCTTCTTZTTCTCT-3' (SEQ ID NO: 16) | 36 | +5.0 |
| 5'-TCTTCTXXXTCTCT-3' (SEQ ID NO: 17) | 50 | +6.3 |
| 5'-TCTTCTYYYTCTCT-3' (SEQ ID NO: 18) | 46 | +5.0 |
| 5'-TCTTCTZZZTCTCT-3' (SEQ ID NO: 19) | 48 | +5.7 |
| 5'-TCTTCXTXTXCTCT-3' (SEQ ID NO: 20) | 53 | +7.3 |
| 5'-TCTTCYTYTYCTCT-3' (SEQ ID NO: 21) | 51 | +6.7 |
| 5'-TCTTCZTZTZCTCT-3' (SEQ ID NO: 22) | 51 | +6.7 |

Conditions: 10 mM sodium phosphate buffer (pH 7.0) containing 200 mM NaCl, 5 mM MgCl₂, and 1.5M of each strand. C shows 2'-deoxy-5-methylcytidine.

In Table 2, X, Y, and Z mean the following modifications.

The sequences of oligonucleotide and modified oligonucleotide are shown in SEQ ID NOs: 13 to 22, and the sequences of double-stranded hairpin DNA is shown in SEQ ID NO: 23.

Enzyme Resistant Ability Experiment

A sample solution (250 L) with final concentrations of 50 mM Tris-HCl buffer (pH8.0), 10 mM magnesium chloride, 0.01 unit 3'-exo nuclease (Crotalus Admanteus Venom Phosphodiesterase:CAVP, manufactured by Pharmacia Biotech), and 7.5 µM of each oligonucleotide was maintained at 37° C. to carry out the reaction. A part (45 L) of the reaction mixture was collected over time, heated at 90° C. for 2 min to deactivate the enzyme, and the remaining amount of oligonucleotide was quantified by HPLC. The HPLC measurement conditions are shown below.

eluent SOLUTION A: 0.1 M acetic acid triethylammonium buffer (pH 7.0)
SOLUTION B: acetonitrile
gradient SOLUTION B concentration: 5-13% (30 min) (TaNA, LNA, natural), 7-11% (60 min) (ENA)
column Waters XBridge (registered trade mark) Shield RP18 2.5 µm (4.6×50 mm)
flow rate 1.0 mL/min
column temperature 40° C.
detection UV (260 nm)

The obtained results are shown in FIG. 1. FIG. 1 is a graph replacing the drawing showing the results of an enzyme resistant ability experiment. Oligonucleotides for enzyme resistance were those of SEQ ID NO: 24 (natural), SEQ ID NO: 24 with the 9th T modified with Me-TaNA, modified with LNA, and modified with ENA.

INDUSTRIAL APPLICABILITY

The present invention may be utilized in, for example, nucleic acid drug industry.

SEQ ID NO: 1: oligonucleotide
SEQ ID NO: 2: modified oligonucleotide
SEQ ID NO: 3: modified oligonucleotide
SEQ ID NO: 4: modified oligonucleotide
SEQ ID NO: 5: modified oligonucleotide
SEQ ID NO: 6: modified oligonucleotide
SEQ ID NO: 7: modified oligonucleotide
SEQ ID NO: 8: modified oligonucleotide
SEQ ID NO: 9: modified oligonucleotide
SEQ ID NO: 10: modified oligonucleotide
SEQ ID NO: 11: single-stranded RNA
SEQ ID NO: 13: single-stranded DNA SEQ ID NO: 14: oligonucleotide
SEQ ID NO: 15: modified oligonucleotide
SEQ ID NO: 16: modified oligonucleotide
SEQ ID NO: 17: modified oligonucleotide
SEQ ID NO: 18: modified oligonucleotide
SEQ ID NO: 19: modified oligonucleotide
SEQ ID NO: 20: modified oligonucleotide
SEQ ID NO: 21: modified oligonucleotide
SEQ ID NO: 22: modified oligonucleotide
SEQ ID NO: 23: double-stranded hairpin DNA
SEQ ID NO: 24: oligonucleotide for enzyme resistance

The invention claimed is:
1. A compound represented by the following formula (I), a pharmaceutically acceptable salt thereof, or a pharmaceutically acceptable solvate thereof:

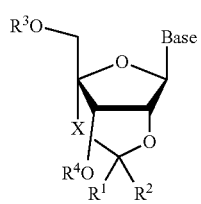

in the formula (I),
Base is a purin-9-yl group or a 2-oxo-1,2-dihydropyrimidin-1-yl group optionally having any one or more substituents selected from an α Group, wherein
the α Group is selected from the group consisting of a hydroxy group, a hydroxy group protected by a protecting group in nucleic acid synthesis, a straight chain alkyl group having 1 to 6 carbon atoms, a straight chain alkoxy group having 1 to 6 carbon atoms, a mercapto group, a mercapto group protected by a protecting group in nucleic acid synthesis, a straight chain alkylthio group having 1 to 6 carbon atoms, an amino group, a straight chain alkylamino group having 1 to 6 carbon atoms, an amino group protected by a protecting group in nucleic acid synthesis, and a halogen atom;
$R^1$ and $R^2$ are each independently
a hydrogen atom or
an alkyl group having 1 to 7 carbon atoms, which is optionally branched or forming a ring, and unsubstituted or substituted by a hydroxy group, a mercapto group, an alkoxy group having 1 to 6 carbon atoms, or an alkylthio group having 1 to 6 carbon atoms;
$R^3$ and $R^4$ are each independently
a hydrogen atom,
a hydroxy-protecting group in nucleic acid synthesis,
an alkyl group having 1 to 7 carbon atoms and optionally branched or forming a ring,
an alkenyl group having 2 to 7 carbon atoms and optionally branched or forming a ring,
an aryl group having 3 to 12 carbon atoms, which optionally has any one or more substituents selected from the α Group and which optionally contains a hetero atom,
an aralkyl group having an aryl moiety having 3 to 12 carbon atoms which moiety optionally having any one or more substituents selected from the α Group and optionally containing a hetero atom,
an acyl group optionally having any one or more substituents selected from the α Group,
a silyl group optionally having any one or more substituents selected from the α Group,
a phosphate group optionally having any one or more substituents selected from the α Group,
a phosphate group protected by a protecting group in nucleic acid synthesis, or
a group represented by $—P(R^5)R^6$ wherein $R^5$ and $R^6$ are each independently a hydroxy group, a hydroxy group protected by a protecting group in nucleic acid synthesis, a mercapto group, a mercapto group protected by a protecting group in nucleic acid synthesis, an amino group, a straight chain or branched chain alkoxy group having 1 to 6 carbon atoms, a straight chain or branched chain alkylthio group having 1 to 6 carbon atoms, a cyanoalkoxy group having 1 to 6 carbon atoms, or an aralkyl group including a straight chain or branched chain alkylamino group having 1 to 6 carbon atoms, an alkyl group having 1 to 7 carbon atoms and optionally branched or forming a ring, an alkenyl group having 2 to 7 carbon atoms and optionally branched or forming a ring, an alkynyl group having 2 to 7 carbon atoms and optionally branched or forming a ring, and an aryl group having 3 to 12 carbon atoms and optionally containing a hetero atom; and
X is an oxygen atom or a sulfur atom.

2. The compound according to claim 1, a pharmaceutically acceptable salt thereof, or a pharmaceutically acceptable solvate thereof, wherein, in said formula (I), Base is a purin-9-yl group or a 2-oxo-1,2-dihydropyrimidin-1-yl group.

3. The compound according to claim 1, a pharmaceutically acceptable salt thereof, or a pharmaceutically acceptable solvate thereof, wherein, in said formula (I), $R^1$ is a hydrogen atom, and $R^2$ is an alkyl group having 1 to 3 carbon atoms.

4. The compound according to claim 1, a pharmaceutically acceptable salt thereof, or a pharmaceutically acceptable solvate thereof, wherein, in said formula (I),
$R^3$ is a hydrogen atom,
a hydroxy-protecting group in nucleic acid synthesis,
an alkyl group having 1 to 7 carbon atoms and optionally branched or forming a ring,
an alkenyl group having 2 to 7 carbon atoms and optionally branched or forming a ring,
an aryl group having 3 to 12 carbon atoms, which optionally has any one or more substituents selected from the α Group and which optionally contains a hetero atom,
an aralkyl group having an aryl moiety having 3 to 12 carbon atoms which moiety optionally having any one or more substituents selected from the α Group and optionally containing a hetero atom,
an acyl group optionally having any one or more substituents selected from the α Group,
a silyl group optionally having any one or more substituents selected from the α Group,
a phosphate group optionally having any one or more substituents selected from the α Group, or
a phosphate group protected by a protecting group in nucleic acid synthesis, and
$R^4$ is a group represented by $—P(R^5)R^6$ wherein $R^5$ and $R^6$ are each independently a hydroxy group, a hydroxy group protected by a protecting group in nucleic acid synthesis, a mercapto group, a mercapto group protected by a protecting group in nucleic acid synthesis, an amino group, a straight chain or branched chain alkoxy group having 1 to 6 carbon atoms, a straight chain or branched chain alkylthio group having 1 to 6 carbon atoms, a cyanoalkoxy group having 1 to 6 carbon atoms, or an aralkyl group including a straight chain or branched chain alkylamino group having 1 to 6 carbon atoms, an alkyl group having 1 to 7 carbon atoms and optionally branched or forming a ring, an alkenyl group having 2 to 7 carbon atoms and optionally branched or forming a ring, an alkynyl group having 2 to 7 carbon atoms and optionally branched or forming a ring, and an aryl group having 3 to 12 carbon atoms and optionally containing a hetero atom.

5. The compound according to claim 1, a pharmaceutically acceptable salt thereof, or a pharmaceutically acceptable solvate thereof, wherein, in said formula (I), X is an oxygen atom.

6. An oligonucleotide having at least one nucleoside structure represented by the following formula (II), a pharmaceutically acceptable salt thereof, or a pharmaceutically acceptable solvate thereof:

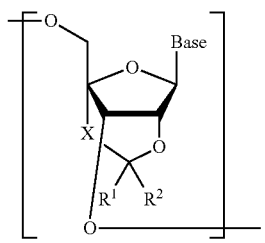

(II)

in the formula (II),
Base is a purin-9-yl group or a 2-oxo-1,2-dihydropyrimidin-1-yl group optionally having any one or more substituents selected from an α Group, wherein
the α Group is selected from the group consisting of a hydroxy group, a hydroxy group protected by a protecting group in nucleic acid synthesis, a straight chain alkyl group having 1 to 6 carbon atoms, a straight chain alkoxy group having 1 to 6 carbon atoms, a mercapto group, a mercapto group protected by a protecting group in nucleic acid synthesis, a straight chain alkylamino group having 1 to 6 carbon atoms, an amino group, a straight chain alkylamino group having 1 to 6 carbon atoms, an amino group protected by a protecting group in nucleic acid synthesis, and a halogen atom;
$R^1$ and $R^2$ are each independently
a hydrogen atom or
an alkyl group having 1 to 7 carbon atoms, which is optionally branched or forming a ring, and unsubstituted or substituted by a hydroxy group, a mercapto group, an alkoxy group having 1 to 6 carbon atoms, or an alkylthio group having 1 to 6 carbon atoms; and
X is an oxygen atom or a sulfur atom.

7. The oligonucleotide according to claim 6, a pharmaceutically acceptable salt thereof, or a pharmaceutically acceptable solvate thereof, wherein, in said formula (II), Base is a purin-9-yl group or a 2-oxo-1,2-dihydropyrimidin-1-yl group.

8. The oligonucleotide according to claim 6, a pharmaceutically acceptable salt thereof, or a pharmaceutically acceptable solvate thereof, wherein, in said formula (II), $R^1$ is a hydrogen atom and $R^2$ is an alkyl group having 1 to 3 carbon atoms.

9. The oligonucleotide according to claim 6, a pharmaceutically acceptable salt thereof, or a pharmaceutically acceptable solvate thereof, wherein, in said formula (II), X is an oxygen atom.

* * * * *

SEQUENCE LISTING

```
<160> NUMBER OF SEQ ID NOS: 24

<210> SEQ ID NO 1
<211> LENGTH: 12
<212> TYPE: DNA
<213> ORGANISM: Artificial Sequence
<220> FEATURE:
<223> OTHER INFORMATION: synthetic oligonucleotide
<220> FEATURE:
<221> NAME/KEY: misc_feature
<223> OTHER INFORMATION: Single strand

<400> SEQUENCE: 1
ggatgttctc gt                                                              12

<210> SEQ ID NO 2
<211> LENGTH: 12
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_difference
<222> LOCATION: (6)..(6)
<223> OTHER INFORMATION: Me-TaNA

<400> SEQUENCE: 2
ggatgttctc gt                                                              12

<210> SEQ ID NO 3
<211> LENGTH: 12
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_difference
<222> LOCATION: (6)..(6)
<223> OTHER INFORMATION: LNA

<400> SEQUENCE: 3
ggatgttctc gt                                                              12

<210> SEQ ID NO 4
<211> LENGTH: 12
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_difference
<222> LOCATION: (6)..(6)
<223> OTHER INFORMATION: ENA

<400> SEQUENCE: 4
ggatgttctc gt                                                              12

<210> SEQ ID NO 5
<211> LENGTH: 12
<212> TYPE: DNA
<213> ORGANISM: Artificial Sequence
<220> FEATURE:
```

```
<223> OTHER INFORMATION: Synthetic oligonucleotide
<220> FEATURE:
<221> NAME/KEY: misc_difference
<222> LOCATION: (6)..(6)
<223> OTHER INFORMATION: Me-TaNA
<220> FEATURE:
<221> NAME/KEY: misc_difference
<222> LOCATION: (7)..(7)
<223> OTHER INFORMATION: Me-TaNA

<400> SEQUENCE: 5
ggatgttctc gt                                                              12

<210> SEQ ID NO 6
<211> LENGTH: 12
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_difference
<222> LOCATION: (6)..(6)
<223> OTHER INFORMATION: LNA
<220> FEATURE:
<221> NAME/KEY: misc_difference
<222> LOCATION: (7)..(7)
<223> OTHER INFORMATION: LNA

<400> SEQUENCE: 6
ggatgttctc gt                                                              12

<210> SEQ ID NO 7
<211> LENGTH: 12
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_difference
<222> LOCATION: (6)..(6)
<223> OTHER INFORMATION: ENA
<220> FEATURE:
<221> NAME/KEY: misc_difference
<222> LOCATION: (7)..(7)
<223> OTHER INFORMATION: ENA

<400> SEQUENCE: 7
ggatgttctc gt                                                              12

<210> SEQ ID NO 8
<211> LENGTH: 12
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_difference
<222> LOCATION: (4)..(4)
<223> OTHER INFORMATION: Me-TaNA
<220> FEATURE:
<221> NAME/KEY: misc_difference
<222> LOCATION: (6)..(6)
<223> OTHER INFORMATION: Me-TaNA

<400> SEQUENCE: 8
ggatgttctc gt                                                              12

<210> SEQ ID NO 9
<211> LENGTH: 12
<212> TYPE: DNA
<213> ORGANISM: Artificial Sequence
```

```
<220> FEATURE:
<223> OTHER INFORMATION: Synthetic oligonucleotide
<220> FEATURE:
<221> NAME/KEY: misc_difference
<222> LOCATION: (4)..(4)
<223> OTHER INFORMATION: LNA
<220> FEATURE:
<221> NAME/KEY: misc_difference
<222> LOCATION: (6)..(6)
<223> OTHER INFORMATION: LNA

<400> SEQUENCE: 9
ggatgttctc gt                                                              12

<210> SEQ ID NO 10
<211> LENGTH: 12
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_difference
<222> LOCATION: (4)..(4)
<223> OTHER INFORMATION: ENA
<220> FEATURE:
<221> NAME/KEY: misc_difference
<222> LOCATION: (6)..(6)
<223> OTHER INFORMATION: ENA

<400> SEQUENCE: 10
ggatgttctc gt                                                              12

<210> SEQ ID NO 11
<211> LENGTH: 12
<212> TYPE: RNA
<213> ORGANISM: Artificial Sequence
<220> FEATURE:
<223> OTHER INFORMATION: Synthetic ribonucleotide

<400> SEQUENCE: 11
acgagaacau cc                                                              12

<210> SEQ ID NO 12
<211> LENGTH: 12
<212> TYPE: DNA
<213> ORGANISM: Artificial Sequence
<220> FEATURE:
<223> OTHER INFORMATION: Synthetic oligonucleotide

<400> SEQUENCE: 12
acgagaacat cc                                                              12

<210> SEQ ID NO 13
<211> LENGTH: 14
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (2)..(2)
<223> OTHER INFORMATION: 2'-Deoxy-5-methylcytidine
<220> FEATURE:
<221> NAME/KEY: misc_feature
<222> LOCATION: (5)..(5)
<223> OTHER INFORMATION: 2'-Deoxy-5-methylcytidine
<220> FEATURE:
<221> NAME/KEY: misc_feature
<222> LOCATION: (11)..(11)
<223> OTHER INFORMATION: 2'-Deoxy-5-methylcytidine
<220> FEATURE:
```

```
<221> NAME/KEY: misc_feature
<222> LOCATION: (13)..(13)
<223> OTHER INFORMATION: 2'-Deoxy-5-methylcytidine

<400> SEQUENCE: 13
tcttcttttt ctct                                                        14

<210> SEQ ID NO 14
<211> LENGTH: 14
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (2)..(2)
<223> OTHER INFORMATION: 2'-Deoxy-5-methylcytidine
<220> FEATURE:
<221> NAME/KEY: misc_feature
<222> LOCATION: (5)..(5)
<223> OTHER INFORMATION: 2'-Deoxy-5-methylcytidine
<220> FEATURE:
<221> NAME/KEY: misc_difference
<222> LOCATION: (8)..(8)
<223> OTHER INFORMATION: Me-TaNA
<220> FEATURE:
<221> NAME/KEY: misc_feature
<222> LOCATION: (11)..(11)
<223> OTHER INFORMATION: 2'-Deoxy-5-methylcytidine
<220> FEATURE:
<221> NAME/KEY: misc_feature
<222> LOCATION: (13)..(13)
<223> OTHER INFORMATION: 2'-Deoxy-5-methylcytidine

<400> SEQUENCE: 14
tcttcttttt ctct                                                        14

<210> SEQ ID NO 15
<211> LENGTH: 14
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (2)..(2)
<223> OTHER INFORMATION: 2'-Deoxy-5-methylcytidine
<220> FEATURE:
<221> NAME/KEY: misc_feature
<222> LOCATION: (5)..(5)
<223> OTHER INFORMATION: 2'-Deoxy-5-methylcytidine
<220> FEATURE:
<221> NAME/KEY: misc_difference
<222> LOCATION: (8)..(8)
<223> OTHER INFORMATION: LNA
<220> FEATURE:
<221> NAME/KEY: misc_feature
<222> LOCATION: (11)..(11)
<223> OTHER INFORMATION: 2'-Deoxy-5-methylcytidine
<220> FEATURE:
<221> NAME/KEY: misc_feature
<222> LOCATION: (13)..(13)
<223> OTHER INFORMATION: 2'-Deoxy-5-methylcytidine

<400> SEQUENCE: 15
tcttcttttt ctct                                                        14

<210> SEQ ID NO 16
<211> LENGTH: 14
<212> TYPE: DNA
<213> ORGANISM: Artificial Sequence
<220> FEATURE:
<223> OTHER INFORMATION: Synthetic oligonucleotide
```

```
<220> FEATURE:
<221> NAME/KEY: misc_feature
<222> LOCATION: (2)..(2)
<223> OTHER INFORMATION: 2'-Deoxy-5-methylcytidine
<220> FEATURE:
<221> NAME/KEY: misc_feature
<222> LOCATION: (5)..(5)
<223> OTHER INFORMATION: 2'-Deoxy-5-methylcytidine
<220> FEATURE:
<221> NAME/KEY: misc_difference
<222> LOCATION: (8)..(8)
<223> OTHER INFORMATION: ENA
<220> FEATURE:
<221> NAME/KEY: misc_feature
<222> LOCATION: (11)..(11)
<223> OTHER INFORMATION: 2'-Deoxy-5-methylcytidine
<220> FEATURE:
<221> NAME/KEY: misc_feature
<222> LOCATION: (13)..(13)
<223> OTHER INFORMATION: 2'-Deoxy-5-methylcytidine

<400> SEQUENCE: 16
tcttcttttt ctct                                                    14

<210> SEQ ID NO 17
<211> LENGTH: 14
<212> TYPE: DNA
<213> ORGANISM: Artificial Sequence
<220> FEATURE:
<223> OTHER INFORMATION: Oligonucleotide
<220> FEATURE:
<221> NAME/KEY: misc_feature
<222> LOCATION: (2)..(2)
<223> OTHER INFORMATION: 2'-Deoxy-5-methylcytidine
<220> FEATURE:
<221> NAME/KEY: misc_feature
<222> LOCATION: (5)..(5)
<223> OTHER INFORMATION: 2'-Deoxy-5-methylcytidine
<220> FEATURE:
<221> NAME/KEY: misc_difference
<222> LOCATION: (7)..(7)
<223> OTHER INFORMATION: Me-TaNA
<220> FEATURE:
<221> NAME/KEY: misc_difference
<222> LOCATION: (8)..(8)
<223> OTHER INFORMATION: Me-TaNA
<220> FEATURE:
<221> NAME/KEY: misc_difference
<222> LOCATION: (9)..(9)
<223> OTHER INFORMATION: Me-TaNA
<220> FEATURE:
<221> NAME/KEY: misc_feature
<222> LOCATION: (11)..(11)
<223> OTHER INFORMATION: 2'-Deoxy-5-methylcytidine
<220> FEATURE:
<221> NAME/KEY: misc_feature
<222> LOCATION: (13)..(13)
<223> OTHER INFORMATION: 2'-Deoxy-5-methylcytidine

<400> SEQUENCE: 17
tcttcttttt ctct                                                    14

<210> SEQ ID NO 18
<211> LENGTH: 14
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (2)..(2)
<223> OTHER INFORMATION: 2'-Deoxy-5-methylcytidine
<220> FEATURE:
<221> NAME/KEY: misc_feature
<222> LOCATION: (5)..(5)
```

```
<223> OTHER INFORMATION: 2'-Deoxy-5-methylcytidine
<220> FEATURE:
<221> NAME/KEY: misc_difference
<222> LOCATION: (7)..(7)
<223> OTHER INFORMATION: LNA
<220> FEATURE:
<221> NAME/KEY: misc_difference
<222> LOCATION: (8)..(8)
<223> OTHER INFORMATION: LNA
<220> FEATURE:
<221> NAME/KEY: misc_difference
<222> LOCATION: (9)..(9)
<223> OTHER INFORMATION: LNA
<220> FEATURE:
<221> NAME/KEY: misc_feature
<222> LOCATION: (11)..(11)
<223> OTHER INFORMATION: 2'-Deoxy-5-methylcytidine
<220> FEATURE:
<221> NAME/KEY: misc_feature
<222> LOCATION: (13)..(13)
<223> OTHER INFORMATION: 2'-Deoxy-5-methylcytidine

<400> SEQUENCE: 18
tcttcttttt ctct                                                        14

<210> SEQ ID NO 19
<211> LENGTH: 14
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (2)..(2)
<223> OTHER INFORMATION: 2'-Deoxy-5-methylcytidine
<220> FEATURE:
<221> NAME/KEY: misc_feature
<222> LOCATION: (5)..(5)
<223> OTHER INFORMATION: 2'-Deoxy-5-methylcytidine
<220> FEATURE:
<221> NAME/KEY: misc_difference
<222> LOCATION: (7)..(7)
<223> OTHER INFORMATION: ENA
<220> FEATURE:
<221> NAME/KEY: misc_difference
<222> LOCATION: (8)..(8)
<223> OTHER INFORMATION: ENA
<220> FEATURE:
<221> NAME/KEY: misc_difference
<222> LOCATION: (9)..(9)
<223> OTHER INFORMATION: ENA
<220> FEATURE:
<221> NAME/KEY: misc_feature
<222> LOCATION: (11)..(11)
<223> OTHER INFORMATION: 2'-Deoxy-5-methylcytidine
<220> FEATURE:
<221> NAME/KEY: misc_feature
<222> LOCATION: (13)..(13)
<223> OTHER INFORMATION: 2'-Deoxy-5-methylcytidine

<400> SEQUENCE: 19
tcttcttttt ctct                                                        14

<210> SEQ ID NO 20
<211> LENGTH: 14
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (2)..(2)
<223> OTHER INFORMATION: 2'-Deoxy-5-methylcytidine
<220> FEATURE:
<221> NAME/KEY: misc_feature
```

```
<222> LOCATION: (5)..(5)
<223> OTHER INFORMATION: 2'-Deoxy-5-methylcytidine
<220> FEATURE:
<221> NAME/KEY: misc_difference
<222> LOCATION: (6)..(6)
<223> OTHER INFORMATION: Me-TaNA
<220> FEATURE:
<221> NAME/KEY: misc_difference
<222> LOCATION: (8)..(8)
<223> OTHER INFORMATION: Me-TaNA
<220> FEATURE:
<221> NAME/KEY: misc_difference
<222> LOCATION: (10)..(10)
<223> OTHER INFORMATION: Me-TaNA
<220> FEATURE:
<221> NAME/KEY: misc_feature
<222> LOCATION: (11)..(11)
<223> OTHER INFORMATION: 2'-Deoxy-5-methylcytidine
<220> FEATURE:
<221> NAME/KEY: misc_feature
<222> LOCATION: (13)..(13)
<223> OTHER INFORMATION: 2'-Deoxy-5-methylcytidine

<400> SEQUENCE: 20
tcttcttttt ctct                                                    14

<210> SEQ ID NO 21
<211> LENGTH: 14
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (2)..(2)
<223> OTHER INFORMATION: 2'-Deoxy-5-methylcytidine
<220> FEATURE:
<221> NAME/KEY: misc_feature
<222> LOCATION: (5)..(5)
<223> OTHER INFORMATION: 2'-Deoxy-5-methylcytidine
<220> FEATURE:
<221> NAME/KEY: misc_difference
<222> LOCATION: (6)..(6)
<223> OTHER INFORMATION: LNA
<220> FEATURE:
<221> NAME/KEY: misc_difference
<222> LOCATION: (8)..(8)
<223> OTHER INFORMATION: LNA
<220> FEATURE:
<221> NAME/KEY: misc_difference
<222> LOCATION: (10)..(10)
<223> OTHER INFORMATION: LNA
<220> FEATURE:
<221> NAME/KEY: misc_feature
<222> LOCATION: (11)..(11)
<223> OTHER INFORMATION: 2'-Deoxy-5-methylcytidine
<220> FEATURE:
<221> NAME/KEY: misc_feature
<222> LOCATION: (13)..(13)
<223> OTHER INFORMATION: 2'-Deoxy-5-methylcytidine

<400> SEQUENCE: 21
tcttcttttt ctct                                                    14

<210> SEQ ID NO 22
<211> LENGTH: 14
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (2)..(2)
<223> OTHER INFORMATION: 2'-Deoxy-5-methylcytidine
<220> FEATURE:
```

```
<221> NAME/KEY: misc_feature
<222> LOCATION: (5)..(5)
<223> OTHER INFORMATION: 2'-Deoxy-5-methylcytidine
<220> FEATURE:
<221> NAME/KEY: misc_difference
<222> LOCATION: (6)..(6)
<223> OTHER INFORMATION: ENA
<220> FEATURE:
<221> NAME/KEY: misc_difference
<222> LOCATION: (8)..(8)
<223> OTHER INFORMATION: ENA
<220> FEATURE:
<221> NAME/KEY: misc_difference
<222> LOCATION: (10)..(10)
<223> OTHER INFORMATION: ENA
<220> FEATURE:
<221> NAME/KEY: misc_feature
<222> LOCATION: (11)..(11)
<223> OTHER INFORMATION: 2'-Deoxy-5-methylcytidine
<220> FEATURE:
<221> NAME/KEY: misc_feature
<222> LOCATION: (13)..(13)
<223> OTHER INFORMATION: 2'-Deoxy-5-methylcytidine

<400> SEQUENCE: 22
tcttcttttt ctct                                                         14

<210> SEQ ID NO 23
<211> LENGTH: 40
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<223> OTHER INFORMATION: Strand of hairpin double-stranded DNA
<220> FEATURE:
<221> NAME/KEY: misc_structure
<222> LOCATION: (20)..(21)
<223> OTHER INFORMATION: C18spacer

<400> SEQUENCE: 23
ggcagaagaa aaagagacgc gcgtctcttt ttcttctgcc                             40

<210> SEQ ID NO 24
<211> LENGTH: 10
<212> TYPE: DNA
<213> ORGANISM: Artificial Sequence
<220> FEATURE:
<223> OTHER INFORMATION: Synthetic olignonucleotide
<220> FEATURE:
<221> NAME/KEY: misc_feature
<223> OTHER INFORMATION: Test Oligonucleotide

<400> SEQUENCE: 24
tttttttttt                                                              10
```